US007292900B2

(12) United States Patent
Kreidler et al.

(10) Patent No.: US 7,292,900 B2
(45) Date of Patent: Nov. 6, 2007

(54) POWER DISTRIBUTION EXPERT SYSTEM

(75) Inventors: Volker Kreidler, Hechingen (DE); Knut Lagies, Stuttgart (DE); Wolfgang Mutscheller, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 393 days.

(21) Appl. No.: 09/950,726

(22) Filed: Sep. 12, 2001

(65) Prior Publication Data
US 2003/0023336 A1 Jan. 30, 2003

Related U.S. Application Data

(60) Provisional application No. 60/305,199, filed on Jul. 13, 2001.

(51) Int. Cl.
G05B 9/02 (2006.01)
(52) U.S. Cl. .................. 700/83; 700/108; 700/109; 700/110; 700/117
(58) Field of Classification Search ................ 700/174, 700/175, 177, 180, 124, 116, 108, 109, 110
See application file for complete search history.

(56) References Cited

U.S. PATENT DOCUMENTS

| | | | |
|---|---|---|---|
| 3,882,305 A | 5/1975 | Johnstone | 235/151.11 |
| 4,390,953 A | 6/1983 | Johnstone | |
| 4,531,182 A | 7/1985 | Hyatt | |
| 4,901,218 A | 2/1990 | Cornwell | 364/131 |
| 5,224,051 A | 6/1993 | Johnson | |
| 5,291,416 A * | 3/1994 | Hutchins | 700/174 |
| 5,335,048 A | 8/1994 | Takano et al. | |
| 5,452,201 A | 9/1995 | Pieronek et al. | |
| 5,469,352 A | 11/1995 | Yukutomo et al. | 364/192 |
| 5,726,912 A | 3/1998 | Krall | |
| 5,742,824 A | 4/1998 | Kosaka | |

(Continued)

FOREIGN PATENT DOCUMENTS

| | | |
|---|---|---|
| DE | 19615190 | 10/1997 |
| DE | 19930660 | 1/2001 |
| EP | 0051861 | 5/1982 |
| EP | 0428735 | 5/1991 |
| EP | 0512 116 A1 | 11/1992 |

(Continued)

OTHER PUBLICATIONS

U.S. Appl. No. 09/950,731, filed Sep. 12, 2001, Kreidler et al.

(Continued)

Primary Examiner—Michael D. Masinick
(74) Attorney, Agent, or Firm—White & Case LLP

(57) ABSTRACT

Content is generated on a host system based on real-time data from a controlled process collected over the internet from a customer's client automation system, such as a machine tool control system. The client system may request content from a host website. Instructions associated with the requested content, which may be in the form of software to be run on the client, is delivered to the client via download over the internet. The client, executing the software, captures real-time data associated with a controlled process and transmits it to the host, where content based on the data can be generated for the client and/or its owner. Data gathered by the host, and content generated on the basis of the data, may be made accessible to machine tool manufacturers. Also, data received by the host is associated with an identifier defined for each client system. A historical database for given client equipment can thereby be created.

13 Claims, 25 Drawing Sheets

U.S. PATENT DOCUMENTS

| | | | |
|---|---|---|---|
| 5,805,442 | A | 9/1998 | Crater et al. |
| 5,844,795 | A | 12/1998 | Johnston et al. |
| 5,844,808 | A | 12/1998 | Konsmo et al. |
| 5,860,068 | A * | 1/1999 | Cook ................. 705/26 |
| 5,975,737 | A | 11/1999 | Crater et al. |
| 5,978,578 | A | 11/1999 | Azarya et al. |
| 6,026,348 | A | 2/2000 | Hala |
| 6,061,603 | A * | 5/2000 | Papadopoulos et al. ....... 700/83 |
| 6,094,600 | A | 7/2000 | Sharpe, Jr. et al. ........... 700/19 |
| 6,263,487 | B1 | 7/2001 | Stripf et al. ................... 717/1 |
| 6,298,308 | B1 | 10/2001 | Reid et al. |
| 6,333,790 | B1 | 12/2001 | Kageyama |
| 6,338,003 | B1 | 1/2002 | Kamiguchi et al. |
| 6,385,497 | B1 | 5/2002 | Ogushi et al. |
| 6,393,380 | B1 * | 5/2002 | Zemlo ................. 702/188 |
| 6,445,969 | B1 | 9/2002 | Kenney et al. |
| 6,463,352 | B1 | 10/2002 | Tadokoro et al. |
| 6,473,656 | B1 | 10/2002 | Langels et al. |
| 6,507,765 | B1 | 1/2003 | Hopkins et al. |
| 6,556,956 | B1 | 4/2003 | Hunt |
| 6,560,513 | B2 | 5/2003 | Krause et al. |
| 6,799,195 | B1 | 9/2004 | Thibault et al. |
| 2001/0049567 | A1 * | 12/2001 | Takeuchi .................... 700/96 |
| 2002/0007422 | A1 * | 1/2002 | Bennett ..................... 709/246 |
| 2002/0013639 | A1 * | 1/2002 | Fujishima et al. .......... 700/175 |
| 2002/0083145 | A1 * | 6/2002 | Perinpanathan ............ 709/213 |

FOREIGN PATENT DOCUMENTS

| | | |
|---|---|---|
| EP | 0772107 | 5/1997 |
| EP | 0822473 | 2/1998 |
| EP | 1102185 | 5/2001 |
| EP | 0875023 | 7/2001 |
| EP | 1115080 | 7/2001 |
| WO | 9002366 | 3/1990 |
| WO | 0062138 | 10/2000 |
| WO | 0073955 | 12/2000 |
| WO | 0150704 | 7/2001 |

OTHER PUBLICATIONS

U.S. Appl. No. 09/950,723, filed Sep. 12, 2001, Kreidler et al.
U.S. Appl. No. 09/950,848, filed Sep. 12, 2001, Kreidler et al.
U.S. Appl. No. 10/052,293, filed Jan. 18, 2002, Kreidler et al.
R. Fernandez: "An Object-Oriented Implementation of Low Level Digital Control Algorithms in the Microsoft Windows/C++ Environment", Proceedings of the International Symposium on Intelligent Control, Monterey, Aug. 27-29, 1995, New York, IEEE US, pp. 229-235.
U. Rembold, P. Levi: Realzeitsysteme zur Prozessautomatisierung, 1994, Hanser Verlag, München, pp. 624-625; pp. 638-651; pp. 660-661.
Naoki Ura et al: "Remote Maintenance Function for Distributed Control System", Advances in Instrumentation and Control, Instrument Society of America, Research Triangle Park, US, vol. 48, Part 3, 1993, pp. 1557-1564, XP000428426.
DOD Standard Transmission Control Protocol, Information Sciences Institute, USA, Jan. 1980, pp. 1-83.
Michael Kmiec: "PhorSale 1.0.8B—An eCommerce application for PHP and mySQL, File: phorSale.sq1", Online!, Jun. 14, 2001, Freshmeat:Net, XP002219121.
Judith S. Bowman, Sandra L. Emerson et al.: "The Practical SQL Handbook", Sep. 1998, Addison Wesley, Reading, Massachusetts, XP002219122, p. 63.
Erkes J.W. et al: "Implementing Shared Manufacturing Services on the World-Wide Web", Communications of the Association for Computing Machinery, New York, US, vol. 39, No. 2, Feb. 1, 1996, pp. 34-45.
Hans B. Kief: "NC/CNC Handbuch", 1995, Carl Hanser Verlag, München Wien, XP002227602, pp. 238-242.
International Search Report for PCT/EP02/07511.
International Search Report for PCT/EP02/07512.
International Search Report for PCT/EP02/07513.
International Search Report for PCT/EP02/07514.

* cited by examiner

POWER DISTRIBUTION EXPERT SYSTEM

This application claims the benefit, under 35 U.S.C. § 119(e), of U.S. provisional patent application No. 60/305,199, filed Jul. 13, 2001, the contents of which are incorporated by reference herein in their entirety. The application is related to co-pending application Ser. No. 09/950,731, filed on even date herewith.

FIELD OF THE INVENTION

The present invention relates to the field of industrial automation and, more particularly, to the delivery of services or software relating to systems for automated machine tools.

BACKGROUND OF THE INVENTION

In the field of industrial automation, and particularly within the subfield concerning machine tools and their use, vendors specializing in control technology and software have provided software to original equipment manufacturers (OEMs), which manufacture and market automated machine tools. The OEMs, in turn, supply automation equipment incorporating this technology and software to end-customers that are typically manufacturers of equipment that own, manage and operate the equipment they purchase from the OEMs. Over the years, OEMs have developed strong relationships with such end-customers.

The OEMs typically do not limit their activities to the development and marketing goods like machine tools, but they also provide follow-up services for the equipment they, and perhaps others, sell to end-customers. While OEMs have provided crucial goods and services, they have been constrained by existing limits on their ability to provide services that take full advantage of detailed information regarding the operation of their machine tools. This constraint stems from limits on the ability of existing systems to gain access to data at the heart of the machine tool control process. Machine tool control software is highly specialized for its given task, and has generally not, in the past, been directed toward the capture or subsequent processing of data for reasons beyond the immediate control of the machine.

For similar reasons, vendors of control systems and software for equipment, such as machine tools, have generally not been in a position to deliver knowledge-based performance improvements in their technology either directly, or in concert with OEMs, to end-customers.

Access to data that is available to the control system of a machine tool, if obtainable and properly managed, could be mined or otherwise taken advantage of to provide end-customers with a variety of efficiencies and other benefits, including improvements in machine availability and lifetime, increases in productivity on the part of end-customer manufacturers using the machines, and other benefits that are described in greater detail below.

An ability to gather live data from industrial controllers, let alone to transmit it over a network to a service provider capable of analyzing, aggregating or otherwise managing such data, and generating solutions for the automated machine tools, have been unavailable. Consequently, there has been no basis for developing any value-added services or software (hereinafter, collectively, "content") as a function of the gathered data, nor to transmit and download content in the form of services or software from a service provider over a network to an end-customer's (client) machine tool control system, for example.

Instead, engineering services associated with automation equipment, such as machine tools, have been provided manually and then primarily only in response to end-customer requests or due to other motivations having nothing to do with the state of actual controller data. This existing manual approach, however, does not make full use of available network and computing technology. It is incapable of delivering real-time or computation-intensive services, or sophisticated machine-related services, such as axis analysis and optimization, machine data checks, wear analysis, machine inspection and acceptance, machine calibration, dynamic machine modeling, workpiece-related services, process analyses, software services, data management services and the like.

The existing approach to providing software and service-related content to users of automation equipment, such as machine tools, is also unable to provide such content with the economies often associated with computer-rendered, as opposed to manual, services. Access to controller software over a network also provides an opportunity for the delivery of free information services to end-customers, such as information regarding software releases, company catalogs, product and service documentation, chat-rooms and user groups, white papers and other information, which may originate with the control software provider, the OEM, or both.

There has also been an unmet need to help customers shorten development times, to establish market presence more quickly and at more favorable costs, and to enable them to do so with products that are superior to those that have previously been available. Addressing this unmet need would entail measures to assure maximum availability of production facilities, reduce the operating costs associated with those facilities, increase their productivity and deliver maximum product quality.

SUMMARY OF THE INVENTION

The long felt, but unmet, needs described above are addressed by various aspects of the system and method according to the present invention.

The system and method according to the present invention involves establishment of a connection over a public network, such as the internet, between an automated machine tool (e.g., a CNC/PLC machine tool) and a host server. Machine tool data from the production process are, in real time, gathered and transmitted over the internet to the host. Data collection can be done in either a synchronous or asynchronous fashion, with the conditions for asynchronous data collection being settable by the operator. At the host, where the data are stored, analyzed and evaluated using any of a variety of applications. The results, which may relate to machine status, machine wear, process stability, workpiece quality, and long-term changes in the capability of the machine, may be sent to the customer that operates the machine also via the internet.

The system and method provide an open application programmer interface (API) for users and manufacturers, allowing recipients of the service and software, provided according to the system and method of the present invention, to customize the content and know-how they obtain from the content provider. The service and software content made available to customers according to the present invention includes, without limitation, machine services, machine performance, workpiece services, data management, and electronic sales (e-sales).

The system and method according to the present invention may also be used to provide machine tool commissioning services (e.g., computer-aided runoff ("CAR") and disturbance analysis in connection with servicing of the machine tool. Variance in results from cyclically performed CAR measurements can also be obtained. Moreover, data from the controller (e.g., handled by NC programs) may be visualized or otherwise processed to reveal weaknesses in the machine tool earlier than previously available.

Moreover, the system and method according to the present invention make possible a data management service, according to which web-based archiving and administration of control-related data (e.g., NC program data, machine data and parameters) is possible. These data are available to the customer and enables with higher data security a quick resumption of production in the event of data losses.

The identification of the data uploaded from a machine tool to the host, in an embodiment of the present invention, with a code specific to the concerned machine tool, enables the creation of a time-history of selected aspects of the machine tool, that in turn provides a wealth of information to the machine tool user, as well as to the OEMs that serve them.

According to an aspect of the present invention, a system for providing content relating to machine tool control, comprises a host system programmed for generating and delivering content relating to a computer controlled machine tool, and further comprises a client system, in communication with the host system, configured for collecting real-time data from the computer controlled machine tool, transmitting the data to the host system, and receiving from the host system content generated as a function of the collected data.

In another aspect of the present invention, a system for providing content to an industrial controller comprises a host system adapted for generating and delivering content relating to the industrial controller, and a client system, in communication with the host system, for collecting real-time data from the industrial controller, transmitting the data to the host system, and receiving from the host system content generated as a function of the collected data.

Yet another aspect of the present invention is a method for generating and delivering content relating to the management of a computer controlled machine tool, wherein a host system is in communication with a client system managed by a customer, the client system being coupled to the computer controlled machine tool. The method comprises the steps of receiving machine tool control data at the host system, the data having been collected by the client system, and generating content at the host system as a function of the data received from the client system; and delivering the content to the customer.

Still another aspect of the present invention is a method for generating and delivering content relating to the management of an industrial controller, wherein a host system is in communication with a client system managed by a customer, the client system being coupled to the industrial controller. The method comprises the steps of receiving machine tool control data at the host system, the data having been collected by the client system, generating content at the host system as a function of the data received from the client system, and delivering the content to the customer.

A further aspect of the present invention is a method for delivering content, over a network, from a host system of a content provider to a customer, where the customer has automated machine manufacturing equipment comprising a client control system including computer equipment coupled to the network and to sensors relating to control of the manufacturing equipment. The method comprising the steps of: transmitting to the client information relating to the availability of the content; receiving a request for the content from the client; transmitting to the client information relating to data to be gathered by the client, the data relating to the equipment; receiving data from the client, the data comprising data gathered by the client in response to the transmission of information relating to the data; and generating content as a function of the gathered data.

An addition aspect of the present invention is a system for delivering content to a customer over a network, the customer having an automated machine tool coupled to a network and to sensors for gathering real-time data relating to the operation of the machine tool. The system comprises a host computer system coupled to the network and in communication over the network with the customer's computer system and a data storage device coupled to the computer and comprising computer program code for configuring the host computer system to transmit over the network to the customer program code for permitting the customer to initiate the delivery of content, configuring the host computer system to receive at least one communication from the customer's computer system relating to a request for content, configuring the host computer system to receive data from customer's computer system the data relating to the automation of the customer's machine tool, generating requested content as a function of the customer initiating of the delivery of the content, and delivering the generated content to the customer's computer system.

Another aspect of the present invention is a method for generating content for delivery over a network, the content being generated by a host in communication with a client system over a network, the client system also being in communication with an industrial controller. The method comprises the steps of transmitting to the client system instructions for configuring the client system to permit it to request initiation of the delivery of the content from the host system, receiving from the client system data relating to the initiation of the delivery of content, transmitting code to the client system directing it to retrieve data from the industrial controller, receiving from the client system data retrieved from the industrial controller and generating content as a function of the data received from the client system.

In another aspect of the present invention, a system delivers machine tool service content over a network to an automated system. The system comprises means for first downloading instructions to the automated system that control one or more aspects of the automated system, means for receiving customer system data over the network from the customer system, the data collected at the direction of the means provided by the downloaded instructions and means for generating machine tool service content as a function of the collected data and for transmitting the content to the customer system over the network.

In another aspect of the present invention, a system for delivering over a network content based upon real-time data captured from an industrial controller, comprises a computer coupled to one or more data storage devices and to a network over which the data captured from the industrial controller are received by the host system, the host system programmed to generate content as a function of the captured data, the content relating to the industrial controller and formatted to to be downloadable to the industrial controller.

Another aspect of the present invention involves a computer controlled manufacturing system, having real-time computer control and that is in communication over a network with a host system for providing content relating to the management of the manufacturing system. This aspect of the invention comprises a subsystem for enabling the receipt of the content, the subsystem comprising a network interface module for communicating over the network with the host system and receiving the content, a machine handler for creating executable jobs based on the received content, the machine handler in communication with the computer supporting real-time control of the manufacturing system, and a machine handler interface coupled to the network interface module and to the machine handler for transferring data between the network interface module and the machine handler in appropriate respective formats.

In still another aspect of the present invention, a method is provided for invoking and receiving content relating to the management of a computer controlled machine tool, wherein a host system is in communication with a client system managed by a customer, the client system being coupled to the computer controlled machine tool. The method comprises the steps of: receiving computer programming code from the host system; in response to the computer programming code, transmitting machine tool control data to the host system, the data having been collected by the client system; and receiving content generated at the host system as a function of the data received from the client system.

In yet another aspect of the present invention, a system provides content relating to machine tool control operated by a user, the system comprising: a host system adapted for generating and delivering content relating to a computer controlled machine tool; a client system, in communication with the host system, for collecting data from an industrial automation system, transmitting the data to the host system, and receiving from the host system content generated as a function of the collected data, the client system communication with the host system comprising a first data path for user communications between the client system and the host system and a second data path for the transmission between the client system and the host system of the data collected from the industrial automation system.

Various other aspects of the system and method according to the present invention are illustrated, without limitation, in the appended claims.

DETAILED DESCRIPTION OF THE INVENTION

Figure 1:
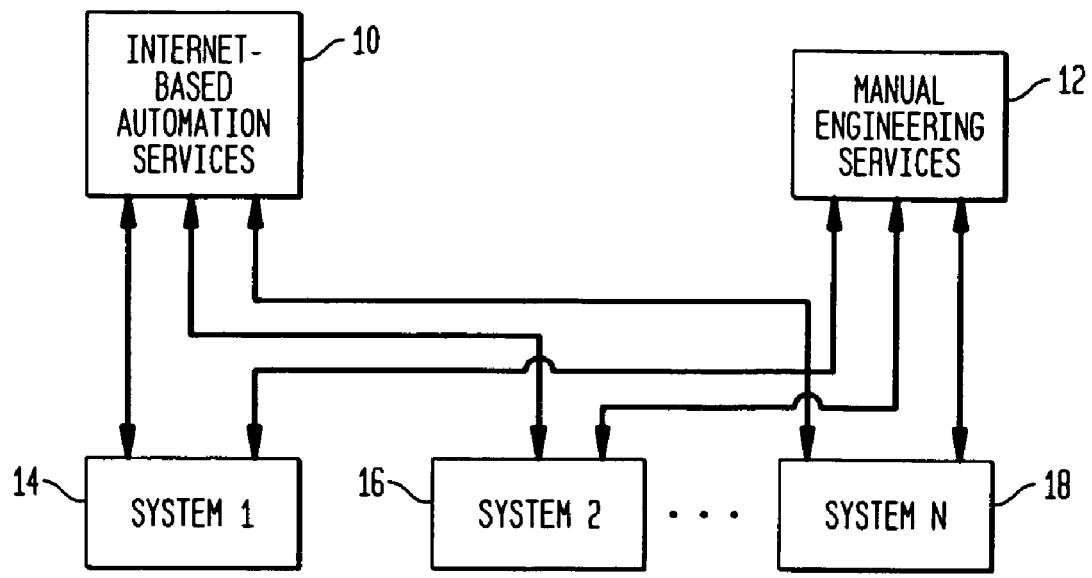
FIG. 1 shows an embodiment of a system, according to the present invention, for delivery of automation services by way of a network, as well as by manual means.

An embodiment of a system and method according to the present invention involves an automation software and services content provider operating a host or server system in communication over a public network, such as the internet, with a client automation system. The embodiment is described by way of an example involving, on the client side, a machine tool having a control system comprising a control kernel (e.g., a numerical control kernel or "NCK"), an operating system such as a suitable version of Microsoft Windows® which performs real-time control and is in communication, via the NCK, with the effector hardware of the machine tool and which receives data obtained via appropriate sensors in the machine tool, and a HMI ("human machine interface") running on the operating system. In this example, communication occurs over the Internet, and the subset of the Internet known as the World-Wide Web, or "web". Other client configurations are also possible within the scope of the invention, as are other public networks and approaches for transferring information via such networks. In the illustrated example, a conventional browser, such as Internet Explorer® or Netscape Navigator® runs on the client operating system, and communicates with the host by downloading web pages from the host and transferring user data.

Although a machine tool is described as a primary example of the type of automation system with which the present invention may be put to use, the systems and methods according to the present invention could be used with any automation system involving real-time control of equipment.

A machine handler is installed, for example, via download over a public network 25 (preferably the internet) from a content provider, and is activated by the customer (referred to here in some contexts as the user or operator) in a machine tool automation system. Public network 25 may be referred to below simply as network 25. A user operating the automation system may access the host, which operates a website, and download web pages that provide a menu for selecting content from the host. The host website then guides the user in a menu-driven fashion supported by web pages, for example, downloadable over the internet or other network from a host server, to either enter information regarding the desired available service, software or other content.

The host application, in response, generates content (e.g., machine tool source code) which is then transmitted over the network to the client. A machine handler interface module running on the control system HMI transfers information from the browser to a machine handler, which in turn may set up a corresponding job, involving interpreting the downloaded content as necessary and loading it, e.g., via an interface between an NCU running an NCK (which interface may be regarded for some purposes as an operating panel logical interface). The machine handler and machine handler interface may be made accessible to the client HMI according to any suitable method, including downloading from the host over the network, or loaded from a storage medium such as a compact disk, or delivered with other controls software supplied to an OEM and thus obtained by the customer through the purchase of the machine tool itself.

The provision of content, such as services or software, can then most preferably take place either upon manual initiation by the end-user operator, or automatically according to a schedule, or upon other conditions, including conditions derived from data gathered from the end-user facility. In any event, if downloaded content comprises instructions that will involve running of the actual machine tool, provision is made for ensuring that activation of the machine according to the content is manually initiated for safety reasons.

Architecture of the overall system, including host, client, and OEM entities are shown in FIGS. 1-7. FIG. 1 shows, at a very high level of abstraction, how an internet-based automation services company 10 may provide content comprising software, services and so forth, to a plurality of customers, represented by systems 1-N (reference numerals 14, 16, and 18, respectively), with whom information is shared on a bidirectional basis. In addition, the usual provider of manual engineering services 12 (e.g., an OEM), of which there may be many, also is in communication with the customer systems 1-N (12, 14, 16). This architecture, while useful for certain applications, may be less than optimal as there is no communication, and certainly none supported by modern network technology, between the internet-based automation services company 10 and the manual engineering services company 12. With this arrangement, neither would benefit from the other's intelligence.

Figure 2:
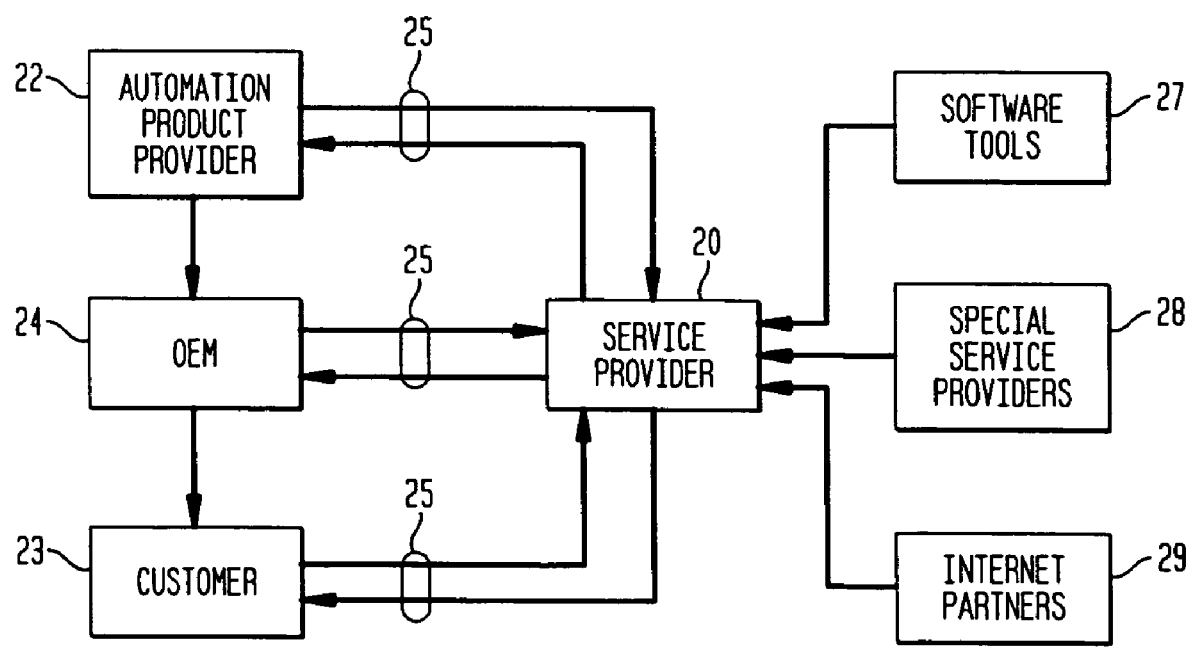
FIG. 2 shows an embodiment of a system, according to the present invention, for providing automation services and/or software to a customer over a network.

In FIG. 2, a usual production chain for machine tools is shown in the left hand portion of the diagram. An automation product provider 22, which is responsible for control system hardware and software, vends it products and services to its customer, a machine tool OEM 24. The OEM 24, in turn, integrates the control system products purchased from the automation product provider with other equipment it manufactures and/or purchases, and sells to its customer 23 (sometimes referred to herein as "end customer"), which is typically a manufacturer. A service provider 20, in an embodiment of the present invention, is in bidirectional communication, preferably over the internet, with all three of the foregoing entities. In addition, the service provider may be in communication with third party providers of software tools 27 and special services 28, as well as with internet partners 29. Although shown as unidirectional in the figure, the information flow may be bi-directional and may also occur over the Internet.

Figure 3:
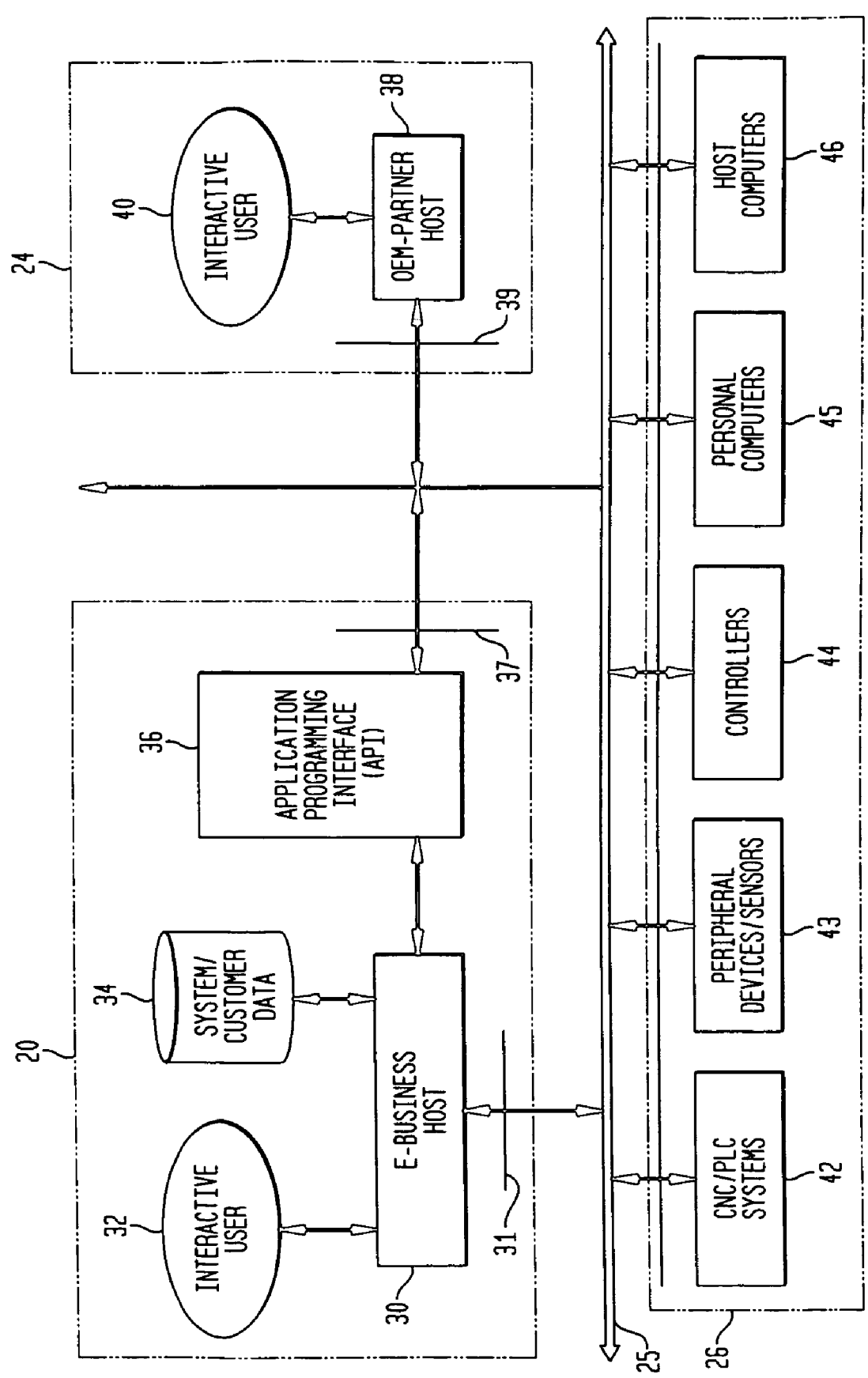
FIG. 3 shows a high-level schematic view of the architecture of an embodiment of a system according to the present invention.

FIG. 3 shows a more detailed view of the service provider 20, OEM 24 and customer 23. Service provider 20 comprises an host 30 (referred to below simply as "host") in communication with a system/customer database 34 and an interactive user 32 that performs administrative or other functions. Any number of such databases 34 and interactive users 32 may interact with host 30. An application programming interface (API) 36 also makes it possible for an OEM partner 24 (in the upper right hand portion of the figure) to deal with the content provided by the host 30. An interactive user at the OEM partner 24 may thereby take advantage of the fruits of access to customer data (as further described below), by communicating with the content provider host 30 over a network 25, which is preferably the Internet. At the OEM 24, one or more interactive users 40 interact with OEM-partner host 38 for administration or other purposes.

Content is also provided over network 25 as between host 30 and client 26. Elsewhere, host 30 may be referred to as host, server, or server/host. Client (or customer) 26 may comprise one or more computer numerical controlled/programmable logic controller (CNC/PLC) systems 42, peripheral devices and sensors, controllers 44, personal computers 45 and host computers 46, some or all of which are in communication over an internal network 47. As will be described at greater length below, client 26 establishes secure communication over network 25 with host 30, selects and receives content over the network 25, transmits data, such as real-time control data back to host 30. In addition, client 26, may transmit over network 25 to host 30 a signal representing a promise to pay value in exchange for the content, or may transmit a credit card number, or any signal relating to the actual or prospective conveyance of value to the content provider. Alternatively, a customer or client code may be transmitted, as well as a machine code specifically identifying a client machine that is the subject of the provision of services or software, and the client 26 or customer 23, or the responsible financial entity (not shown) may later be billed or otherwise charged for the downloaded content.

All available precautions may be taken to ensure the security and integrity of data transferred between the content provider 20, OEM partner 24 and client 26. For example: firewalls 31, 37, 39, respectively provide a measure of security for communications over the Internet with the host 30, host API 37, and OEM-partner host 38. A firewall and other security features, for example, but without limitation, password protection and encryption schemes, are also preferably provided between client 26 and the network 25. The firewall and security features for client 26 are provided through internal network 47.

Figure 4:
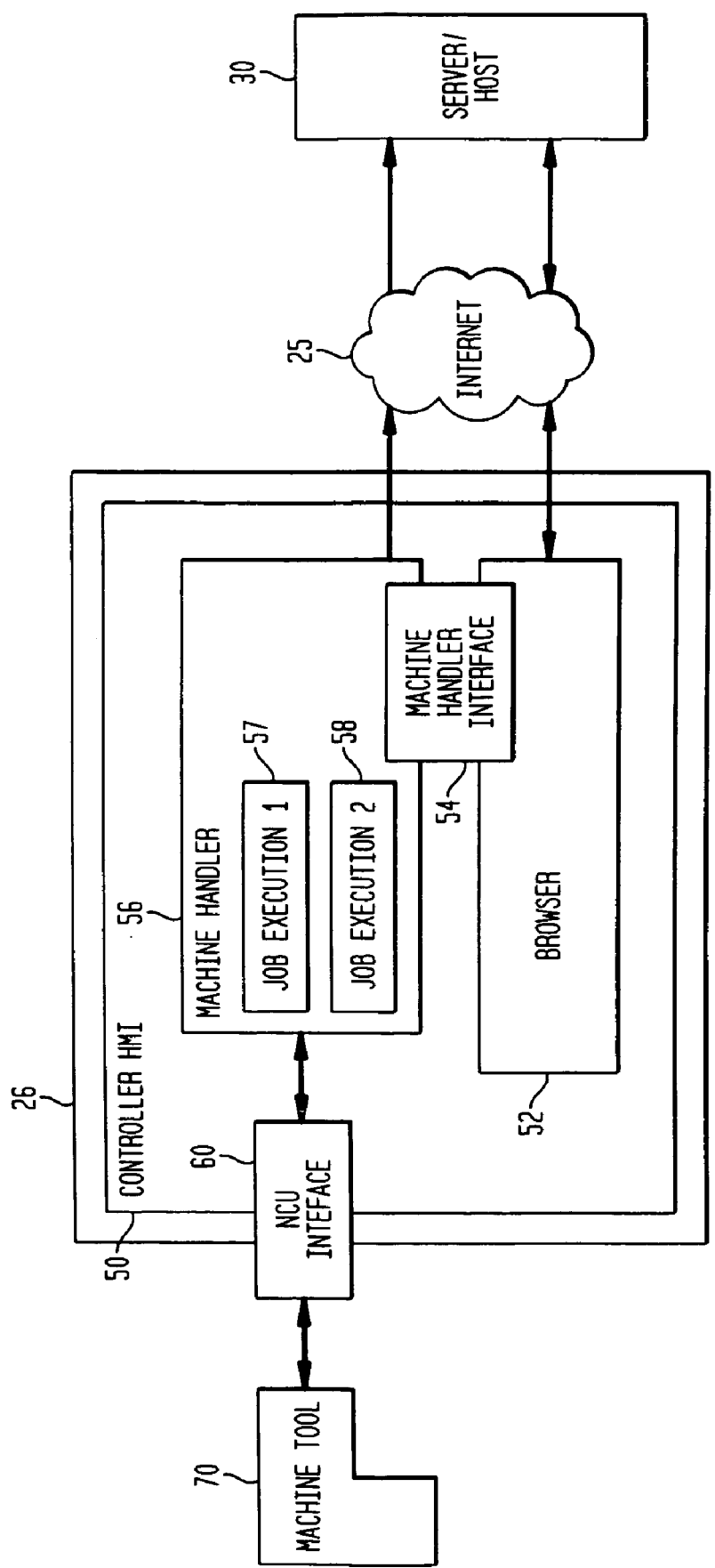
FIG. 4 shows a schematic view of the server-client architecture in an embodiment of a system according to the present invention, with an emphasis on the architecture of the client side of the system.

FIG. 4 shows an embodiment of an architecture of a system according to the present invention, focussing primarily on a customer's client system, on the left side of the internet, and its communication with content provider host 30. In this embodiment, the customer's client system comprises a controller, such as a SINUMERIK controller manufactured by Siemens AG, comprising a processor running, perhaps among other things, an HMI (or human machine interface) 50. HMI 50 is in communication with an NCU interface 60, which is in turn with a machine tool 70.

The HMI 50 is the portion of the controller software with which an operator (not shown) interacts. HMI 50 supports and provides access to various applications and, in many existing controllers, is in turn supported by a modern operating system sharing at least some similarities to operating systems familiar to users of PCs. Another portion of the software associated with the machine tool control system is the numerical control portion, which comprises a numerical control unit (NCU) and kernel (NCK) (not shown) that actually communicate with the machine tool 70 and NCU interface 60. Relevant computation involving NCU and NCK will be discussed at greater length in connection with FIG. 7.

The controller HMI 50 of the client system is in bi-directional communication over network 25, preferably the internet, with server/host system 30, operated by the content provider. A lower set of arrows couple browser software within the client to the host (which correspond to reference numerals 500 in FIGS. 5 and 600 in FIG. 6). Client browser 52, which may run on the operating system described above, is capable of downloading web pages from the host 30. Browser 52 provides network interfacing functionality that could be provided by other suitable software, as long as it were compatible with network 25. An operator (not shown) interacting with HMI 50 and using the browser 52 can access a website (not shown) running on host 30 and begin to request certain content. The transfer of data in the illustrated embodiment is primarily from the host 30 to the browser 52. The operator's responses to downloaded content, which may include certain choices and parameters, involve transporting information back over the internet (i.e., the world-wide web) to the host in any manner consistent with configuration of network 25 and host 30. However, no machine control-related data, e.g., real-time control data, is transmitted to the host 30 in this fashion.

The client system also comprises a machine handler 56, also running in the context of the HMI system 50, which comprises any functionality that can receive instructions originating from the host 30 and create jobs 57, 58 that will ultimately involve calling the NCK.

The browser 52 and machine handler 56 are in communication with one another via a machine handler interface 54, which converts content downloaded from the host 30 via the browser 52 into a format that the machine handler 56 can process. In an embodiment of the invention, browser 52 communicates with machine handler interface 54 via remote procedure calls, using, for example, COM technology available from Microsoft Corporation of Redmond, Wash. Likewise, the machine handler interface 54 communicates with machine handler 56 using remote function calls, leading machine handler 56 to create and execute jobs, at 57, 58, that will ultimately direct the machine tool and capture data generated in running the machine tool 70. Machine handler 56 is in communication with an NCU interface module 60, which converts job orders into a format that the NCK (not shown) is capable of processing. Among such execution tasks are ones that call for one or more machine tool commands to be processed by the NCK, as well as ones that collect data from among any available machine tool state data or other control-related data. Data collection may be done using existing trace functionality available with existing machine control systems and using the data capture approach described below in connection with FIGS. 7 and 8. In addition, within the scope of the present invention, other enhanced trace functionalities may be developed to extract data in a different fashion than is currently available.

The system architecture in the embodiment of the present invention shown in FIG. 4 thus includes asymmetric data paths, namely a first, bi-directional path for interactions concerning selection and download of content and a second, uni-directional path for transmitting captured data (e.g., real-time control data) from the client to the host 30. On advantage of this asymmetric data path architecture is that real-time control data can be sent in a more secure and speedy fashion than would be the case if it were being sent in connection with the operator's web session with host 30. The port for receiving such real-time control data at host 30, and the processor(s) with which it could communicate, could be configured to receive incoming data as quickly as necessary in a dedicated fashion.

The initiation of machine tool commands may, for safety reasons, require the manual intercession of an operator. Data collected in connection with a job order overseen by the machine handler may then be transferred to the host. The transfer of such data is shown, in the illustrated embodiment of this aspect of the present invention, in the upper arrows. The transfer of data is preferably unidirectional, and does not involve the world-wide web. Rather, it preferably is transported via the most available and secure network means available, since there may not be the possibility to delay receipt of the data being collected and transported while a more public means like the world-wide web suffers from the usual congestion and other problems. In some embodiments, however, the world-wide-web is a suitable transport means.

Figure 5:
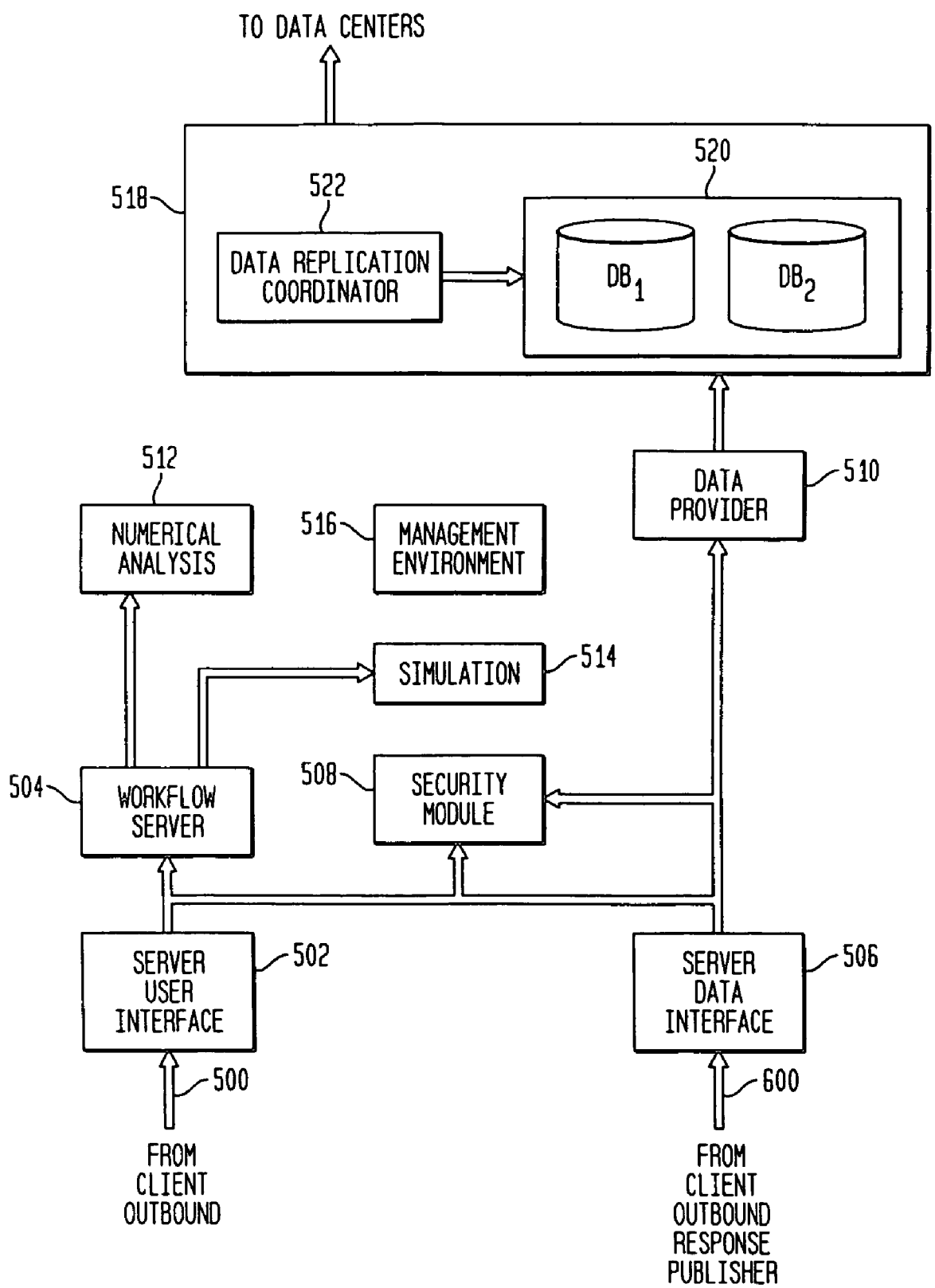
FIG. 5 shows, in schematic form, system architecture associated with the configuration of an embodiment of a host portion of the system according to the present invention.

In summary, FIG. 5 shows: how content may be downloaded from a content provider host to a machine tool client, for example at the request of an operator; how the downloaded content can be used by the client system to create and execute machine tool job orders that yield data of interest; how the data can be collected from the machine tool control system and transferred in a suitable fashion to the host. At the host site, a variety of types of content of value to the owner or operator of the client system may be generated as a function of the gathered data. Examples of such content are provided in the appendix near the end of this document.

More specifically, FIG. 5 shows system architecture associated with an embodiment of server/host 30. Data are received from and sent to client 26 over data path 500 and via server user interface 502. The server user interface 502 may provide web service, in other words, a website, and communicate with client 26 via hypertext transfer protocol (http) or other suitable protocol. In some embodiments, server user interface 502 may run on multiple machines to provide redundancy in the event of hardware or software failure.

Server user interface 502 also communicates, optionally, with workflow server 504, which acts in the capacity of a background request processor that, in effect, assists in processing time consuming tasks. Server interface 502 may also communicate with server data interface 506. Server data interface 506 receives data uploads over network 25 on data path 600 from client 26. This data often comprises real-time control data captured from the machine tool 70 or other automated equipment. In one embodiment, the data may be formatted by client 26 to include a header or preamble that may be used by the server/host 30 to handle the data associated with the header or preamble and, for example, to direct that data to a particular processor. The formatted data are then transported via http or other suitable protocol.

Server user interface 502 and server data interface 506 are both in communication with security module 508 and data provider 510. Security module 508 provides functionality, according to known methods, for ensuring that entities attempting to gain access to server/host 30, or certain aspects of it, are authorized to do so.

Data provider 510 serves as a data interface with the database portion of server/host 30. It serves, in effect, to shield server user interface 502 and server data interface 506 from needing to know how data are being handled by the system's database software, so that software may be more easily modified, for example.

Returning to the workflow server 504, which receives data from the server user interface 502 and server data interface 506, it is in communication with numerical analysis module 512 and simulation module 514. Numerical analysis module 512 is responsible for analyzing data that is received from client 26. Simulation module 514 simulates the behavior of aspects of customer machines in connection with the provision of requested content. Management environment 516, provides a data center and computing resources available for the entire server/host system 30 and computing resources and may detect errors or issue appropriate warnings.

Data provider 510 is in communication with data center 518, which comprises database software 520 and data replication coordinator 522. Database software, which may comprise any suitable functionality, such as SQL clusters, may support a plurality of databases ($DB_1$, $DB_2$, . . . ) 520 (analogous to ref. num. 34 of FIG. 3). The databases 520 can be accessed by interactive user 32, OEM partner 24 (for which the links are not shown in this figure) or other entities. Data replication coordinator 522 comprises software responsible for handling data that may be relevant, but that may reside, or need to reside, in one or more data centers that are remotely located, for example, on a different continent.

Figure 6:
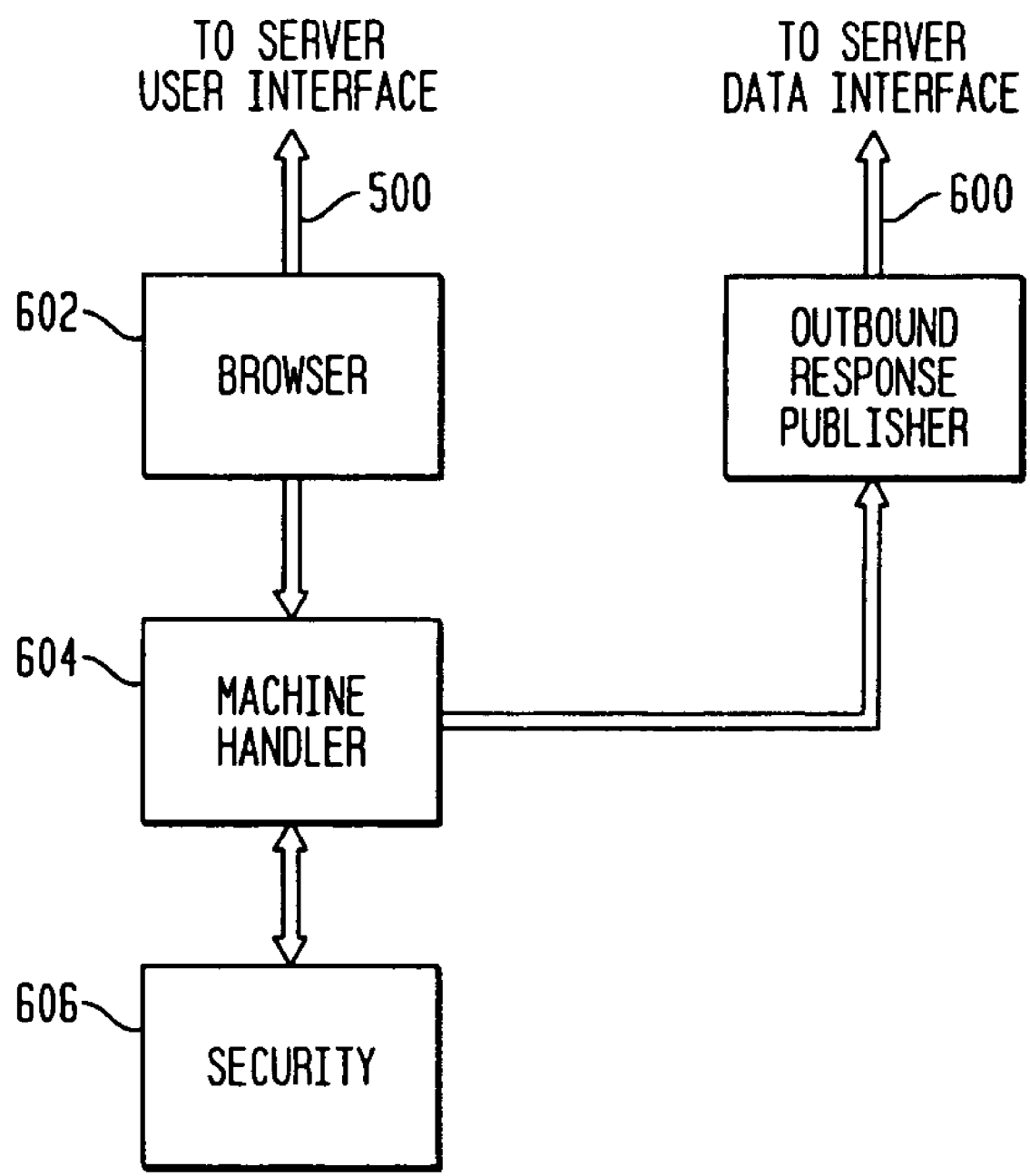
FIG. 6 shows, in schematic form, system architecture associated with the configuration of an embodiment of a client portion of the system according to the present invention.

Architecture for the client 26, in an embodiment of an aspect of the present invention, is shown in FIG. 6. Data are sent to, and received from, server user interface 502 of server/host 30. Data are transmitted back and forth via data path 500 over network 25 (not shown in this view) by browser 602, which runs on HMI 50 of client 26. As with analogous browser 52 of FIG. 4, browser 602 receives data from server/host 30 via http over the Internet or other network. The data are likely to be in the form of a web page that identifies a service to client 26 via an operator who, running browser 602 and having logged in to server/host 30, selects a service presented by server/host 30 by returning a message using a button on a web page. An example of the type of interaction supported under this architecture is described in connection with FIGS. 11-23.

Browser 602 communicates with machine handler 604 (see analogous structure 56 in FIG. 4), which communicates with the controller that runs the automated equipment of interest (not shown in this Figure). Machine handler 604, which receives data captured from the controller, also communicates with security module 606, which also runs on HMI 50 of client 26. Security module 606 ensures that all communications with client 26 come only from server/host 30 or other authorized server. Security module 606 thus prevents potential hacks or attacks on automated systems by non-authorized parties that, if not kept out, might be able to issue control instructions to the detriment of the automated system or gain access to data that the owner of client system 26 would prefer to keep secret.

In FIGS. 5 and 6, data may be shared between modules as to which no links are shown, or may be accessed by a user from modules for which no outputs are shown, in accordance with the needs of the content provider.

Other architectures for the functionality of the client side, according to the present invention, might avoid the use of a browser. Such approach, however, while within the scope of the present invention, could expose the machine handler functionality directly to the internet.

Yet another client architecture within the scope of the present invention might lump the functionality associated with the browser, machine handler and machine handler interface and the NCU interface within a single or smaller number of modules. Such an approach, however, because it would be less modular, might be more expensive to build and maintain.

One aspect of the present invention concerns the ability to gather or "capture" controller data, which may be real-time in nature, from the controllers associated with particular automated equipment. The captured, low-level data regarding the state of the controlled machine or equipment is, in an embodiment of the invention, specified by program code downloaded via data path 500 (FIGS. 5 and 6) into HMI 50 of client 26. An embodiment of architecture for implementing this functionality is shown in FIG. 7. Host 30 is in communication with HMI 50 (of client 26, not explicitly shown in this Figure) via network 25. HMI 50 is also coupled to data storage device 52. As described above, HMI 50 provides the user interface portion of an industrial control device, and typically would be equipped to run any number of applications, including browsers and the like. Because one of the primary purposes of the HMI 50 is to enable an operator to modify aspects of the controller for a particular machine tool or other piece of automated equipment, HMI 50 communicates with another process, typically running on a separate processor, that is responsible for machine control.

Data capture associated with the present invention involves a "trace" function. Comprehensive trace functionality provides control (e.g., HMI, NC, PLC) and drive data to a user more comprehensively and optimally. Whether this functionality is provided directly or via value-added services may depend upon the application to which a trace is put.

By way of an overview of this aspect of the present invention, in one embodiment, downloaded program code comprises compile cycles. A compile cycle is a functional supplement to the real-time control software that is being provided by OEM software developers based on a compatible application interface of the numeric control kernel. In the current embodiment, compile cycles can be developed and compiled into a library on the base of an API without any code of the control software. The compiled compile cycle can then be downloaded to the control. After changing control configuration accordingly (setting of some machine data) the compile cycle is dynamically linked into the control software upon the next power-up of the system. From this point, the functional supplements provided by the compile cycle are available within the real time processing of the control.

Data capture, alternatively, involves trace functionality where compile cycles are not downloaded, but rather where parameterization and control of existing trace functionality is done through an NCU interface 60. This may be done by software resident in HMI 50 that maps internet requests to the operating panel interface, or to parameterization/control of a trace. Alternatively, control of trace functionality may be done via a download of any HMI application that performs these tasks, which can be downloaded like any code downloadable over the web. In the case of software resident in HMI that maps internet requests to the operating panel interface, the control logic, i.e., the sequence of steps to be performed, would preferably reside on the host system 30 and the local software would have only a gateway functionality to the NCK. Where an HMI application is downloaded, the control logic would reside in the software downloaded to the HMI 50. Whether this software is, for example, a java/java script applet or any windows program that is downloaded and installed to run on HMI using HMI-OEM application programming interface (API), is an implementation detail.

Available automation controllers provide NCK-OEM APIs, as well as HMI-OEM API's, which automation product provider 22 typically provides in order to allow OEM 24 to customize features specific to its hardware and the needs of its customer 23. Data capture functionality could use NCK-OEM API alone, or HMI-OEM API alone. NCK-OEM is preferable if the data capture functionality must work even without the HMI connected and if functionality requires additional real-time processing, such as preprocessing of data, extended trigger capabilities, or the like.

Figure 7A:
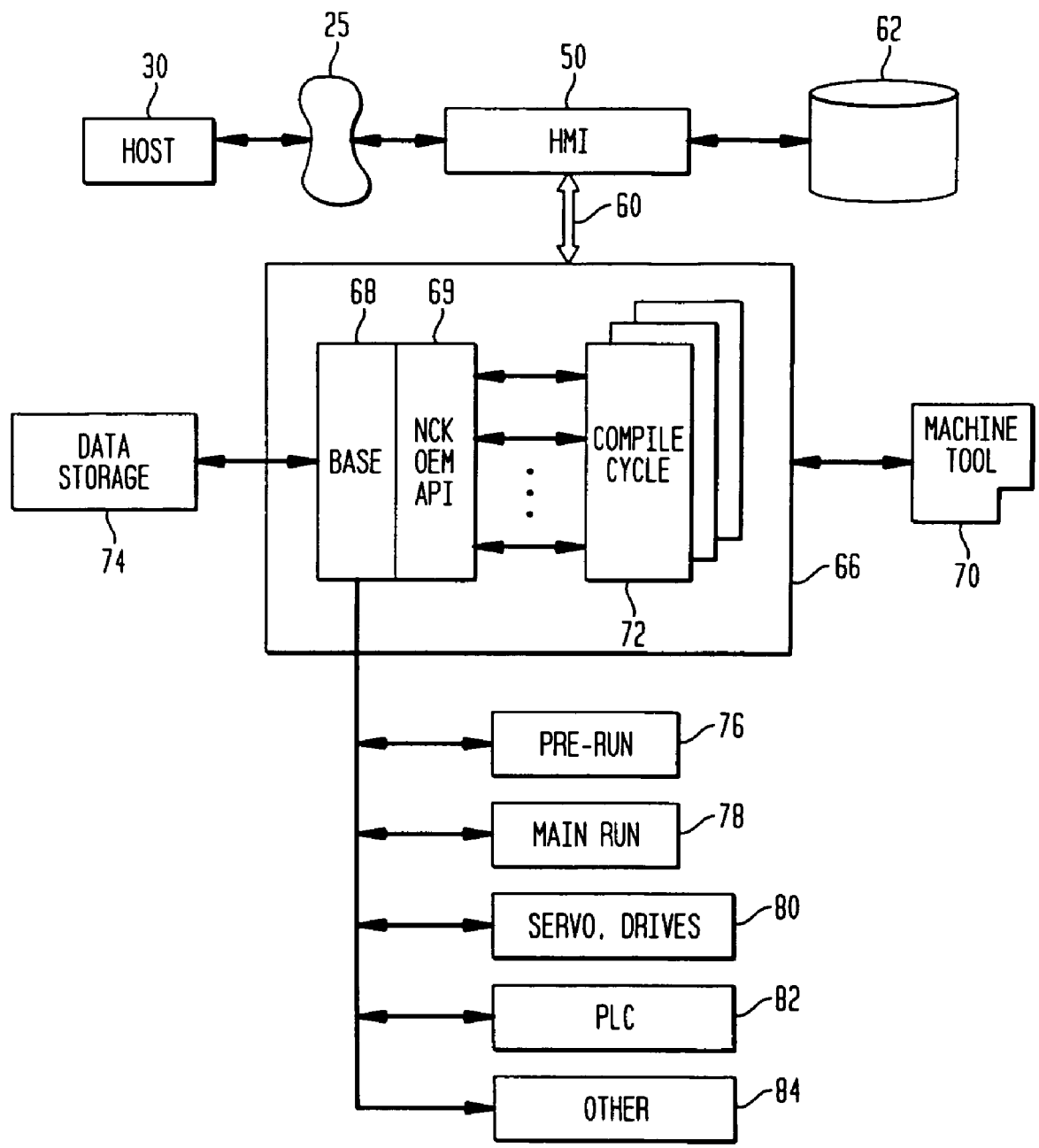
FIGS. 7A and 7B show, in schematic form, system architecture associated with embodiments of aspects of the client portion of the system responsible for capture of real-time data.
Figure 7B:
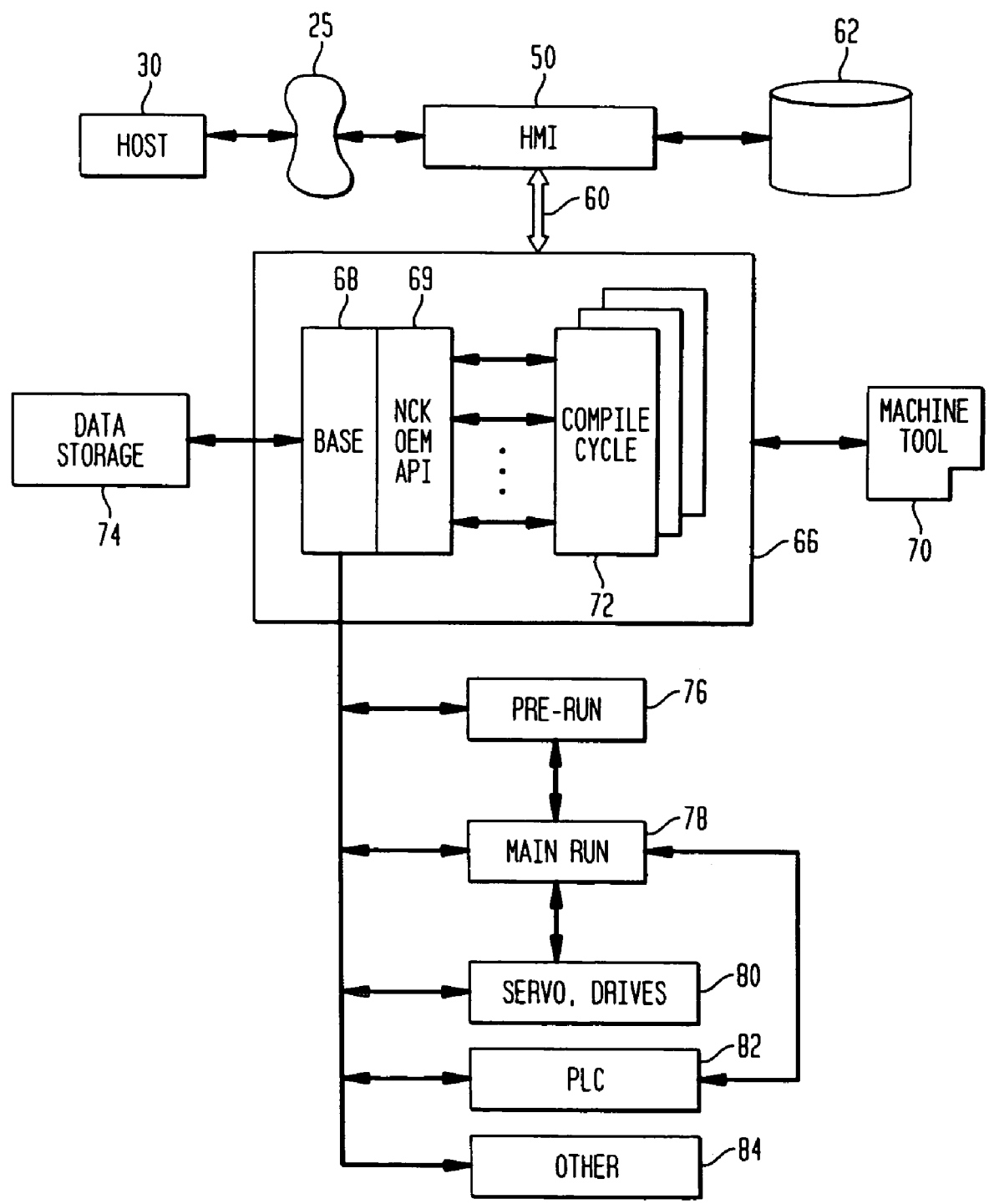

Two embodiments of a system configured for capture of real time industrial control data are shown, respectively, in FIGS. 7A and 7B. The illustrated embodiment relates to a controller (CNC) for a machine tool; however, the inventive features described below may find application as well in other industrial automation contexts.

One feature of the data capture functionality according to the present invention is that the program code that enables the preprocessing and capture of real-time controller data may be downloaded over a network. An operator, such as interactive user 32 identified in FIG. 3, who is interacting with HMI 50, selects a particular network-delivered service (see the example described in FIGS. 11-23). The service is selected, for example, from an internet website provided by a service provider (host) 30. Appropriate program code is transmitted over the network to HMI 50. The HMI 50, via the NCU interface 60, machine handler interface 54 and machine handler 56, and NCK 66, has influence over the control of machine tool 70 or other controlled industrial equipment. NCK 66 includes a base system 68, an NCK OEM application interface 69, that permits downloaded program code to be plugged into the NCK 66 as compile cycle(s) 72. Base system 68 provides a trace functionality for data capture that can be extended through NCK OEM application interface 69. This trace functionality locally gathers data and stores it into a buffer or queue associated with any of the levels 76-84 (even), after which a non-cyclic task takes buffer data and stores it into a file in data storage 74, which may be, for example, static RAM, such that it can later be merged into the trace data. The file in data storage 74 may also be used in queue mode, wherein data are added at one location while being dumped at the other end, or in a circular buffer mode, wherein the oldest data are lost. To extend the trace capability to user program information not directly available to base system 69, trace code may be inserted into user programs (e.g., to PLC user program in the form of a special function block) that provides local user program data to the trace functionality. These particulars can be configured by content provider 20, which will be downloading program code and configuration data from host 30.

The base system 68 is also in communication with various level control tasks, including pre-run control tasks 76, main (i.e., interpolator (IPO) level) control tasks 78, servo control and drive data control tasks 80, PLC data 82 and other information sources 84 within the machine control, and thereby has access to all time levels within the control, including the fastest time level. Compile cycles 72 (e.g., downloaded program code) have access to the base system 68, control tasks 76, 78, 80, PLC data 82 and other information sources 84, through NCK-OEM application interface 69. As shown in FIG. 7B, pre-run 76 and main run 78 control tasks may share information, as may main run 78 and servo control and drive data control tasks 80, as well as main run 78 and PLC data 82 tasks.

Designed on the basis of an understanding of the structure of the NCK 66 and its interface functionality, downloaded programs can include compile cycles compatible with the NCK 66 that can be configured to extend the trigger, event or data capabilities of the trace, by accessing through NCK-OEM application interface 69 the required information from NCK 66, preprocessing it, and providing the results to the trace. The included compile cycles can also be configured to set up and control a trace of preselected, real-time data that is available to NCK 66 either directly or through extensions provided by the compile cycle(s) 72 as described above. The included compile cycles can also be configured to effect any kind of influence to the control system that can be implemented using the NCK-OEM application interface 69 (e.g., moving axes under control of compile cycle). The resulting program code is downloaded to HMI 50 and stored, via NCU interface 60, in NCK 66. The downloaded code can then be dynamically linked to the NCK library. The downloaded code may include: (1) code that implements real-time preprocessing of available NCK data and that provides the results of preprocessing as traceable data to the trace functionality; (2) code that analyses available event and state information of the NCK 66 and creates, from this new information, new events for invoking the trace functionality; (3) code that analyzes available data or event and state information, compares it to configured conditions and, thus, provides new trigger capabilities ot the trace functionality; (4) code that influences the control system through NCK-OEM application interface 69 in a desired way, possibly being synchronized to a trace by means of provided events or data; and (5) code and configuration data that configures the trace functionality in the desired way.

Configuration of the trace functionality requires specification of: (1) data lists that define what data is to be captured through the trace functionality; (2) events, upon the occurrence of which the trace functionality for particular data in the data list is to be invoked; (3) triggers whose detection terminates the trace functionality; and (4) a post-trigger delay period, defining a delay between the detection of a trigger and the associated cessation of the respective trace. By way of example, the events (and triggers) on which data are to be captured (or on which data capture is to be terminated) can be cyclic, such as every interpolation cycle in a machine tool control context, or non-cyclic, e.g., every time a new tool is changed.

Data lists are configuration data stored in the base system 68 and can be accessed externally through operator panel interface 64, or machine handler interface 54 and machine handler 56 of FIG. 4, or internally through a compile cycle interface, i.e., to the operator panel interface 64 or machine handler interface 54 and machine handler 56 of FIG. 4. In an embodiment of this aspect of the present invention, a desired trace functionality for data capture could be included within downloaded program code. In other, presently preferred embodiments, downloaded NCK program code is employed to extend trade capabilities, while configuration and start are done through an HMI 50 application that may be downloaded from host 30 over the network 25 or may be a resident gateway application that maps host 30 communication to operator panel interface 64, or machine handler interface 54 and machine handler 56, shown in FIG. 4. Or, alternatively, downloaded NCK program code may read specific configuration from machine data or global user data, provided via a download of machine data or global user data files.

Figure 8:
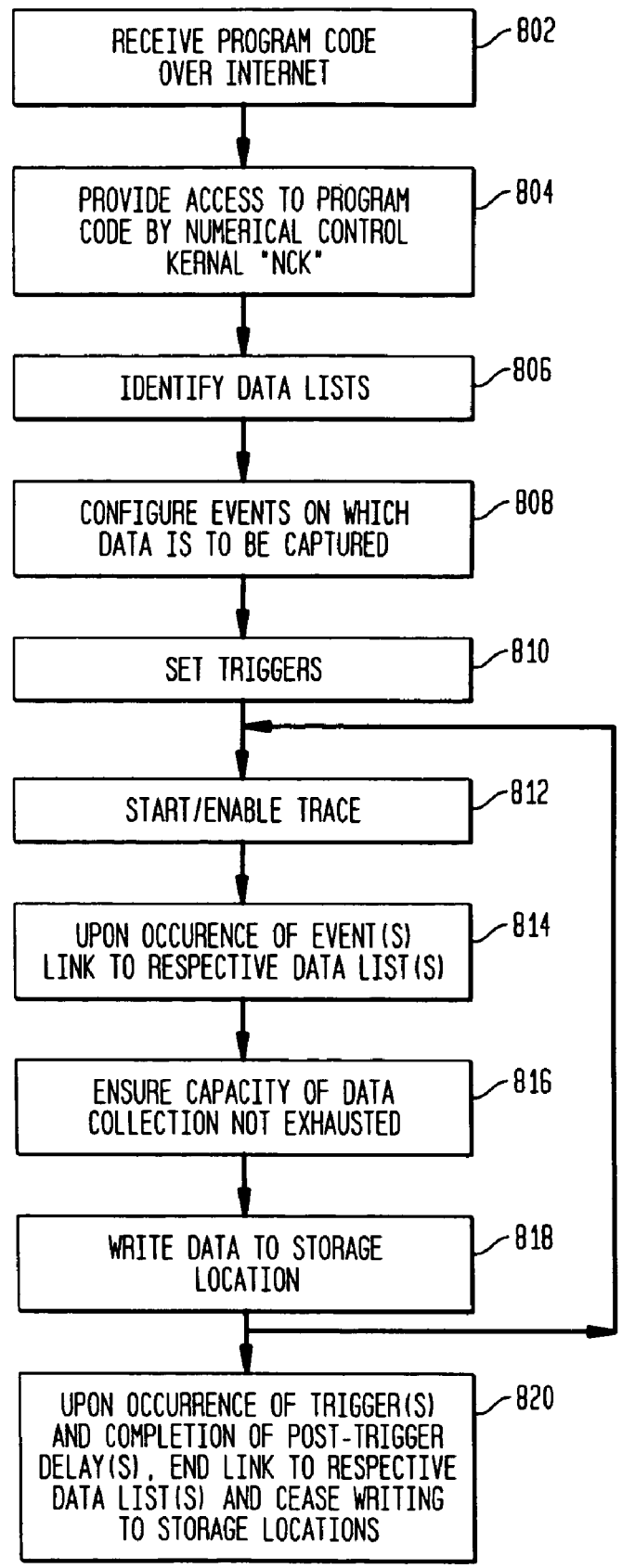
FIG. 8 shows, in flowchart form, steps associated with an embodiment of a method, according to the present invention, for capturing or real-time data from a CNC machine tool or other automated manufacturing equipment.

FIG. 8 provides a high-level flowchart that describes steps associated with a method of performing data capture in an embodiment of the present invention. A client system HMI 50 receives program code associated with a selected service from host 30 over network 25 at step 802. Access by the real-time controller (here, NCK 66) is provided to the downloaded program code (e.g., as described above) at step 804 and program code is executed. At step 806, data lists are identified and configured, which specify which data are to be captured. This can be done through execution of the accessed code or through other means (e.g., through download of configuration data form network to NCK 66). In addition, at step 808, respective events are configured, on the occurrence of which the specified data are to be captured. Again, this can be done through execution of accessed code or other means, as described above. At 810, triggers are set, also according to the accessed, downloaded code, or to other means, as described above.

At step 812, a trace is started/enabled. This step also can be done through execution of accessed code or through action initiated over the network 25. Then, upon occurrence of an event configured at step 808, as detected at step 814, a link is made to the respective data list. Linking to a data list comprises storing a reference to which data list should be used. For this purpose, each data list has an appropriate identification, for example, an ID number. If data lists are user-specific, corresponding user identification may be included in a data list identification. A plurality of users may specify and run its own independent traces in parallel, subject to the constraint that resources such as memory or processor time may not be overused.

If the data collection capacity of the base system 68 has not been exhausted, as checked at step 816, then, based on the linked data list that contains a number of entries, each identifying one data to be recorded, all desired information is being accessed through NCK base system 68 and, if required, through execution of the downloaded software. The specified data are written at step 818 to data storage 74, which may occur by way of an appropriate buffer. As long as the capacity of data storage 74 is not exhausted, the trace continues until, at 820, occurrence of a respective trigger is detected. At the end of a post-trigger delay, assuming one had been specified, the link to the respective data list(s) are ended and writing to storage location 74 is terminated. If the data collection capacity had, at step 16, been exhausted, step 820 would also be invoked.

At this stage, data collected in data storage 14 may be accessed by the downloaded program code residing in HMI 50 which may, in turn, display it for an operator and may then transmit it over network to host 30 for storage, analysis or other operations.

A trace function can be specified in at least two ways. In one specification, called a "normal trace", the trace is begun and ended upon definite events, and a transfer occurs only when the trace is stopped. In a second specification, called an "endless trace", the trace runs in the background, with continuous transfer of captured data outside the client system (e.g., to an HMI).

A trace entails read-only access to the NCK (numerical control kernel) data. Write-access, e.g., by a function-generator, contradicts the actual definition of a trace and therefore would be added, if at all, as an additional function in combination with the trace function. This might be the case, for example, where for certain automatic procedures a function generator and a trace are externally coupled functions.

Configuration of a trace, which takes into account relevant information including mode of operation, etc., may proceed off-line. If a trace is on-going, boundary conditions cannot be modified. Rather, a trace must be halted or suspended for changes to be made to the configuration of the trace.

The actual analysis or visualization provided by a trace is not an aspect of the trace functionality itself, but rather of the applications that utilize one or more traces.

Possible applications of the comprehensive trace functionality include: machine commissioning support; failure detection and debugging of system problems; applications problems (especially for complex applications with multiple channels, synchronous actions, etc.); run-time situations (sporadic run-time problems); crash-handling (complete data gathering via NC Kernel dump), logic analysis (oscilloscope, tachometer, etc.).

There are a number of common requirements for the captured information. These include: the accommodation of data including system variables, drive signals, PLC flags, as well as events (status, changes in status, binary signals, alarms, etc.); access to local user program data (e.g., in the NC program, flags in the PLC program); copying of traced local data into a suitable global variable. All data and events, including data from all system components, especially the previously hard to access and combinable information from motion synchronous (internal) actions, PLC and drives, and all information that is available over an operator screen interface may be treated as triggers for the trace function. For expert or internal purposes, in each case, unrestricted access via the physical address may be possible.

There may in some instances be certain requirements for conducting a trace, e.g., with PLC data. Access to PLC peripherals, or to flags in a user program, without the impact on the PLC may be arranged. Access to the user program data (I>flags, . . . ) and an ability to synchronize the point at which recording takes place with the user program, if necessary through additional commands inserted into the user program, may be arranged. However, access to PLC peripherals, or to flags in a user program, without impact on the PLC and/or the user program is preferable in an embodiment of the invention. Similarly, an embodiment of the invention includes up to 32 PLC signals traceable at the same time. Also, to the extent necessary, available user data may be fetched from within the relevant user program by inserting appropriate commands into the user program which store the relevant data into the trace buffer. Additionally, buffer data available from different sources within a machine tool/control system may be merged into a joint set of data and be displayed or analyzed by an appropriate user program on HMI.

The recording process is preferably efficient and tailored to the particular use. The efficiency conditions, in essence, require recording only the necessary information and recording no more often than necessary. A clear distinction should preferably be maintained between continual signal and events (sporadic signals). If possible, data compression is done during recording (taking into account run-time influence) and care should be taken to minimize administrative overhead, that is, to achieve the minimal possible recording positions.

If conditions of use are unknown or not definable, the full spectrum of possible uses and operating methods is preferably supported. For example, depending upon the application, ring buffers in which loss is limited to the oldest data may be preferable to a queue arrangement in which the newest data are lost upon the queue becoming full. Eventual additional information that would be required might include a time stamp, time counters and so forth. Other use-specific requirements may depend upon the quantity of data, modes of operation, and optional additional information demanded by a particular application.

For example, for debugging of difficult errors, the act of recording a trace should preferably be as free as possible from crashing. That is, in the run-up after an error, earlier recorded data should be saved.

Most preferably, recording of each variable could be done as a function of its own timing characteristics to reduce the amount of involved data. In principle, timing the recording of a variable to implicitly incorporate the function/scope of the variable may, for example, reduce the amount of data that needs to be gathered.

The collection of data on an event or condition driven basis, instead of doing so continuously, may be preferable. Rather than necessarily occur in a trace file, an additional file or archive could be automatically created that can also contain NC programs, including main programs, subprograms, cycles, etc. A reference or pointer to this archive would then automatically be registered in the trace file. One can therefore be protected in advance from inconsistencies that can be associated with a manual implementation of this function. Manual archiving may take place days after the data collection, during which configuration data may have already changed. This can also be specified through an application, which means that internal interfaces may not need to fulfill this condition.

In an embodiment of the present invention, transformation in the configuration, as necessary, of distributed components may be programmed to occur automatically. Also, the collection and supply of available meta-information for the configuration should, as far as possible, be automated. The HMI logical interface may serve as an internal configuration interface. For flexible expandability with minimum expenditure, new signals may simply be merged with HMI logical interface components in a trace.

A method of procedure control for the foregoing, or for the traces, should preferably offer the following functions: start conditions (manual, NC program, PLC, synchronized action, automatic time-controlled, continuously running, external entry, etc.) and stop/trigger conditions (manual, NC programmed, PLC, synchronized action, internal additions, time controlled, external events, etc.). Data are to be stored in the file (associated with the HMI).

Trigger conditions are preferably settable within states: trigger on individual bits; trigger on changes in state variables from state X to state Y (precisely defined state transitions) using text instead of numerical codes to identify states; trigger on definite NC instruction number; triggers on the nth occurrence of a given relevant code. To the extent necessary, trigger conditions for each variable are separated out. Chains of conditions may be used: for example, first condition 1 must be fulfilled, then condition 2 or condition 3, and, if then condition 5 is fulfilled, particular data will be recorded until condition 6 occurs.

For example, after a crash or a stop, as soon as data are transferred, the resources are again preferably free. Note that there must, as necessary, be a coupled condition, so that automatic restart is shut off as soon as possible if, for example, an interesting event or condition (such as an error) has occurred.

As described elsewhere in this document, the preparation of data appropriately takes place in the HMI. According to different embodiments of aspects of the present invention, applications can be bound exclusively on a file basis. Also, a COM connection may be used to support block access via continuous data stream (without buffering on the file). Three classes of users are to be served: (1) prepared users, such as control software vendor applications on the HMI, e.g. trace visualization, IBN or diagnosis tool; (2) OEM-users (client applications via HMI-OEM); and (3) web-based services.

In an embodiment of the present invention, a trace should be open to the user. Open, accessible interfaces for configuration (which signals, how installed), include controls (start, stop . . . ), analysis (data file format) for OEMs.

The display of a trace, according to an embodiment of the present invention, is comparable to a logic-analyzer-oscilloscope. Signals from different sources may be displayed. References to program modules may be displayed. Cursor/zoom function is preferably provided. More than four (4) signals are preferably possible. Filters are also preferably provided to permit visualization of a selection of signals. Assistance may be provided in explaining the various signals and events, given that normal users are not necessarily familiar with all such information.

High robustness of the data gathering may be achieved in the following ways. Data should, to the extent possible, be available after a crash. Sudden errors during a trace should not lead to a data overflow and there should be a suitable reaction in the event of resource scarcity. If an interesting event or condition has occurred, data files may not later be erased.

Preferably, a system using the data capture functionality described above should use no more than approximately 60% of available cycle time, which may help to avoid interference with any running applications.

Figure 9A:
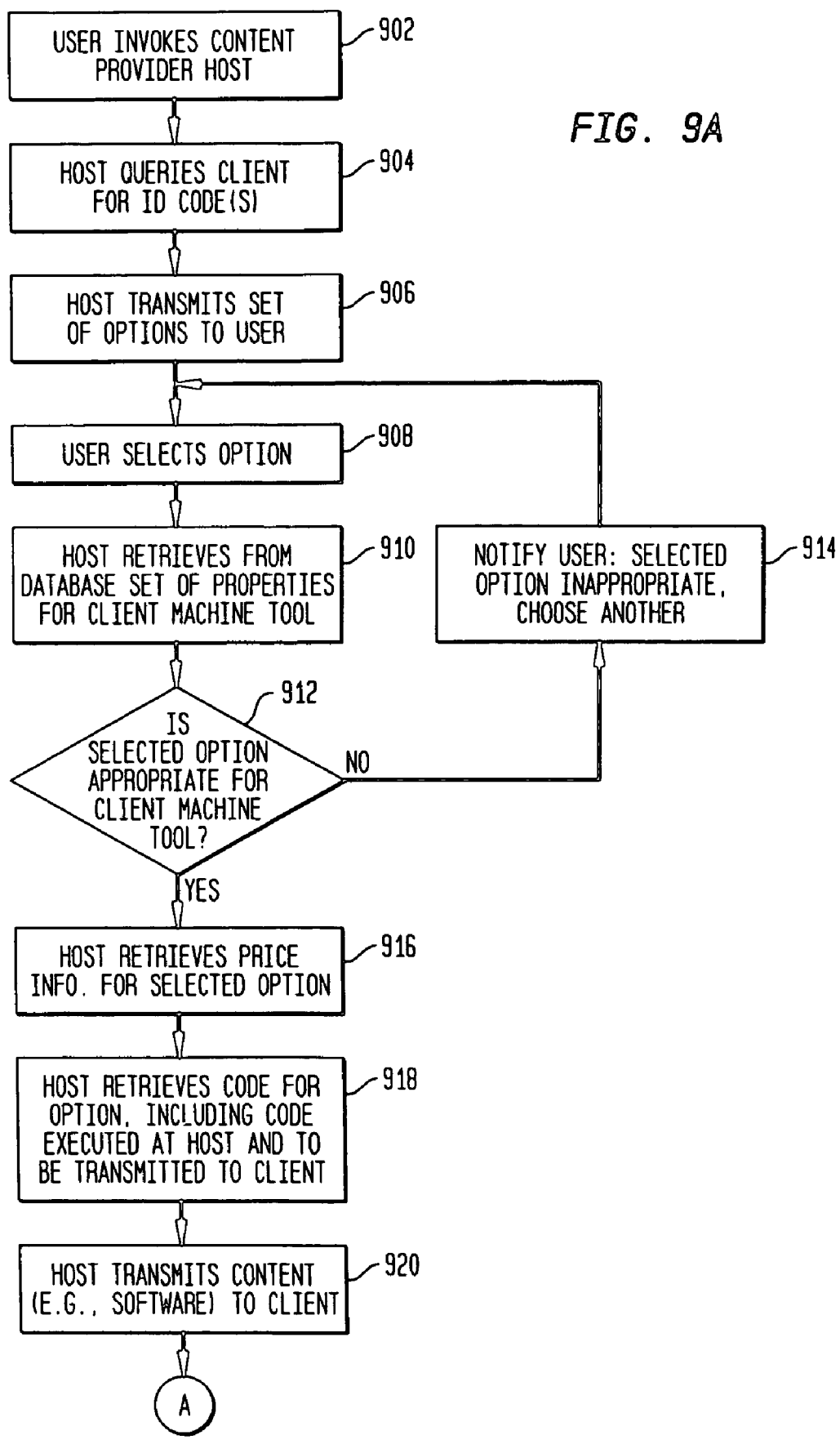
FIGS. 9A-9C show, in flowchart form, steps associated with an embodiment of a method, according to the present invention, for providing automation-related content via a network based upon real-time control data and constructing databases incorporating the real-time control data.
Figure 9B:
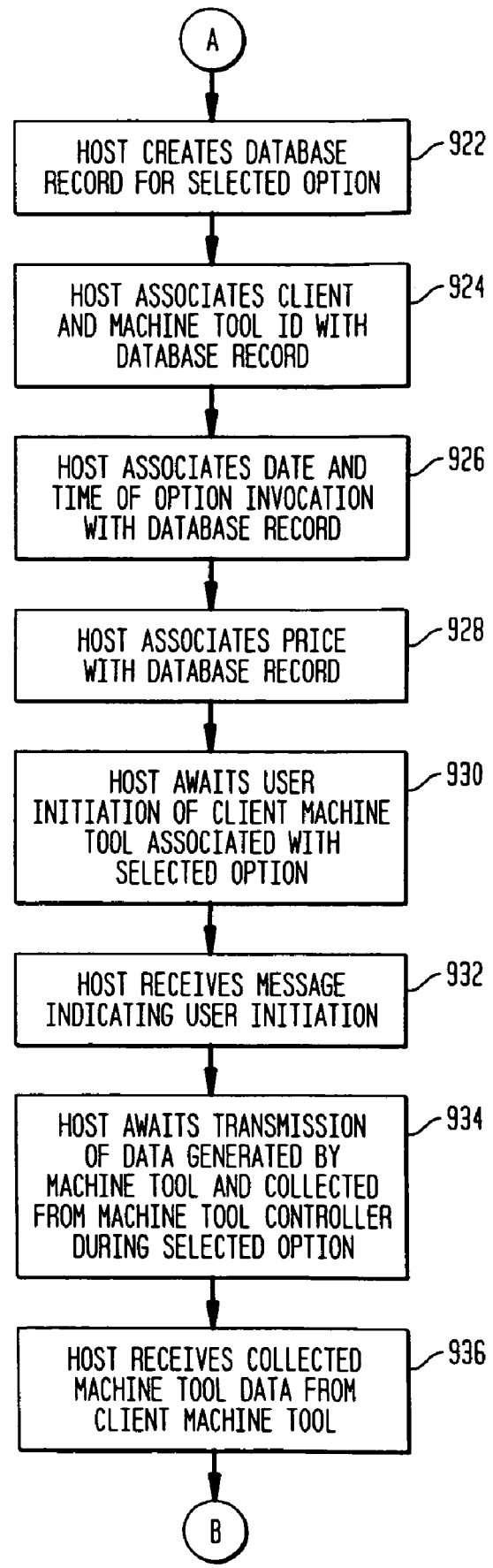
Figure 9C:
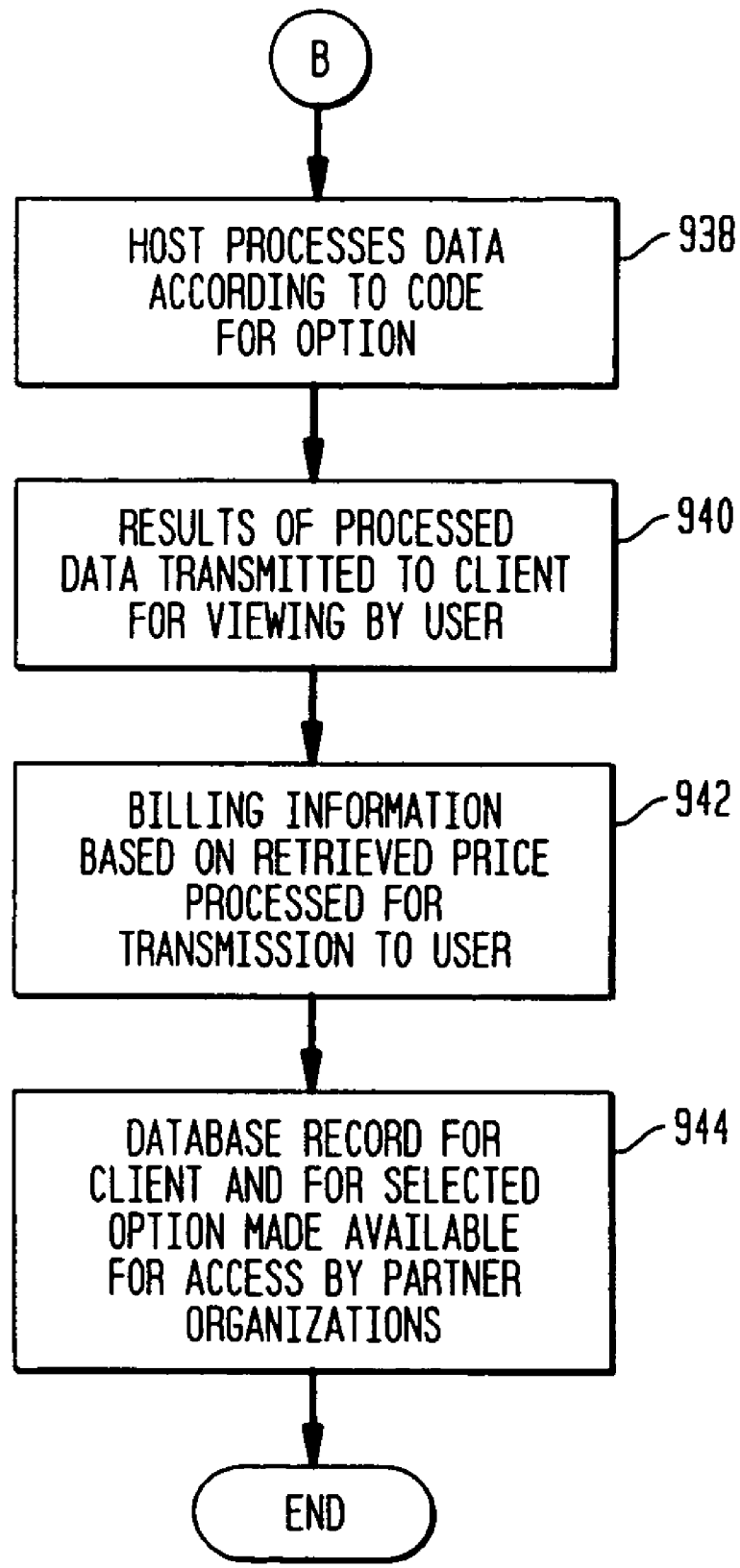

An embodiment of a method, according to the present invention, for providing automation-related content via a network based upon real-time control data and constructing databases incorporating the real-time control data is shown in flowchart form in FIGS. 9A-9C.

A user of client 26, which in the illustrated embodiment is a machine tool, but which could in other embodiments be other automated equipment, invokes host 30 operated by content provider 20 at 902. In the present embodiment, but without limitation, host 30 and the user of client 26 communicate via the web. Host 30 transmits a web page, at 906, that queries the user for ID codes, that may include a customer ID code and a machine ID code. The customer ID, which will have been established during an earlier registration process in which a variety of customer-specific data will have been collected, allows the host 30 to retrieve such customer data and establish a session appropriate for that customer. In addition, host 30 may access data regarding the various types of automated equipment that its customers operate and as to which it offers services. After receiving the machine ID, host 30 may retrieve information suitable for a session that allows the user to select from among content, including services, appropriate for the customer's needs and that are offered for the type of machine corresponding to the machine ID. Further detail regarding the data available to host 30 is presented below in connection with FIG. 10.

Upon establishing such a session taking into account the identity of the customer and the involved machine, host 30 transmits to the user a set of options that may be tailored to the customer, at 906. The user transmits and the host 30 receives the user's selection of an option, at 908. Based upon the user's selection, host 30 retrieves from a database a set of properties for the client machine tool, at 910, and confirms, at 912, that the selected option is appropriate for the machine tool being operated by client 26. If not, host 30 notifies the user, at 914, that the selected option is inappropriate under the circumstances and that another option should be selected.

Otherwise, the host 30 retrieves price information for the selected option, at 916, and retrieves content, e.g., program code, associated with the selected option, at 918, that may be executed at the host 30 and/or at the client 26. In general, data will be transferred to client 26, to be used, according to the description provided above, to assist in controlling the machine tool and gathering particular, resultant data. Following its retrieval, any content, such as program code, that has been retrieved by the host 30 is transmitted to client 26, at 920.

At 922, FIG. 9B, host 30 creates a database record for the transaction corresponding to the option selected by the user. (See also FIG. 10 and accompanying description). Host 30 associates the client and machine tool IDs with the database record, at 924. In addition, at 926, host 30 associates the date and time the selected option is invoked with the database record established at 924. Moreover, host 30 may also associate the earlier-retrieved (or other) price data with the database record, at 928.

Next, host 30 awaits user initiation of client machine tool behavior corresponding to the selected option and the associated, downloaded program code and/or data. The purpose of this waiting step, at 930, is to ensure user safety: particularly when moving machinery is involved, running the machinery should involve a manual step to help make sure the operator is aware of imminent machine activity before it begins and thereby avoid injury to personnel.

Host 30 receives a message, at 932, indicating that the user has initiated activity associated with the selected option. Host 30 also then awaits transmission, at 934, of data generated in connection with operating the machine tool and collected from the machine tool controller during the course of the selected option. Then, at 936, host 30 receives machine tool data collected from the client 26 machine tool. Host 30, at step 938, processes data collected from client 26 according to code corresponding to the option selected by the user. Then, at step 940, the results of processing the data uploaded from client 26 (e.g., generated by numerical analysis module 512, of FIG. 5) are transmitted to client 26, or, in some embodiments, to an entity that owns or controls it.

When the session or transaction comes to a close, or at another suitable time, billing information is retrieved or generated, at 942, based on retrieved price information and is processed for transmission to the user or its owner or operator.

As the session approaches termination, a suitable data structure, such as a database record, corresponding to client 26 and to the selected option and including the data describing the various aspects of the transaction, is made available, at 944, for access by the customer that owns and/or operates client 26, or by partner organizations (e.g., OEM 24 in FIG. 3). Access by an OEM 24 is preferably made only with the approval of the entity that owns or operates client 26, an indication of which approval may also be included among the data stored by host 30 for particular customers. Access also may be made contingent upon the prior or subsequent conveyance of value to the customer 23 (that is the owner and/or operator of host 30) by the OEM 24. The price for access, in either case, may follow any commercially suitable arrangement. In one embodiment, a first price component is determined as a flat rate function of a given recurring time period, and a second price component is computed as a function of the provided content.

The order and the particulars of the above-steps may be varied. Moreover, other steps may be added without departing from the scope of this aspect of the present invention.

Figure 10:
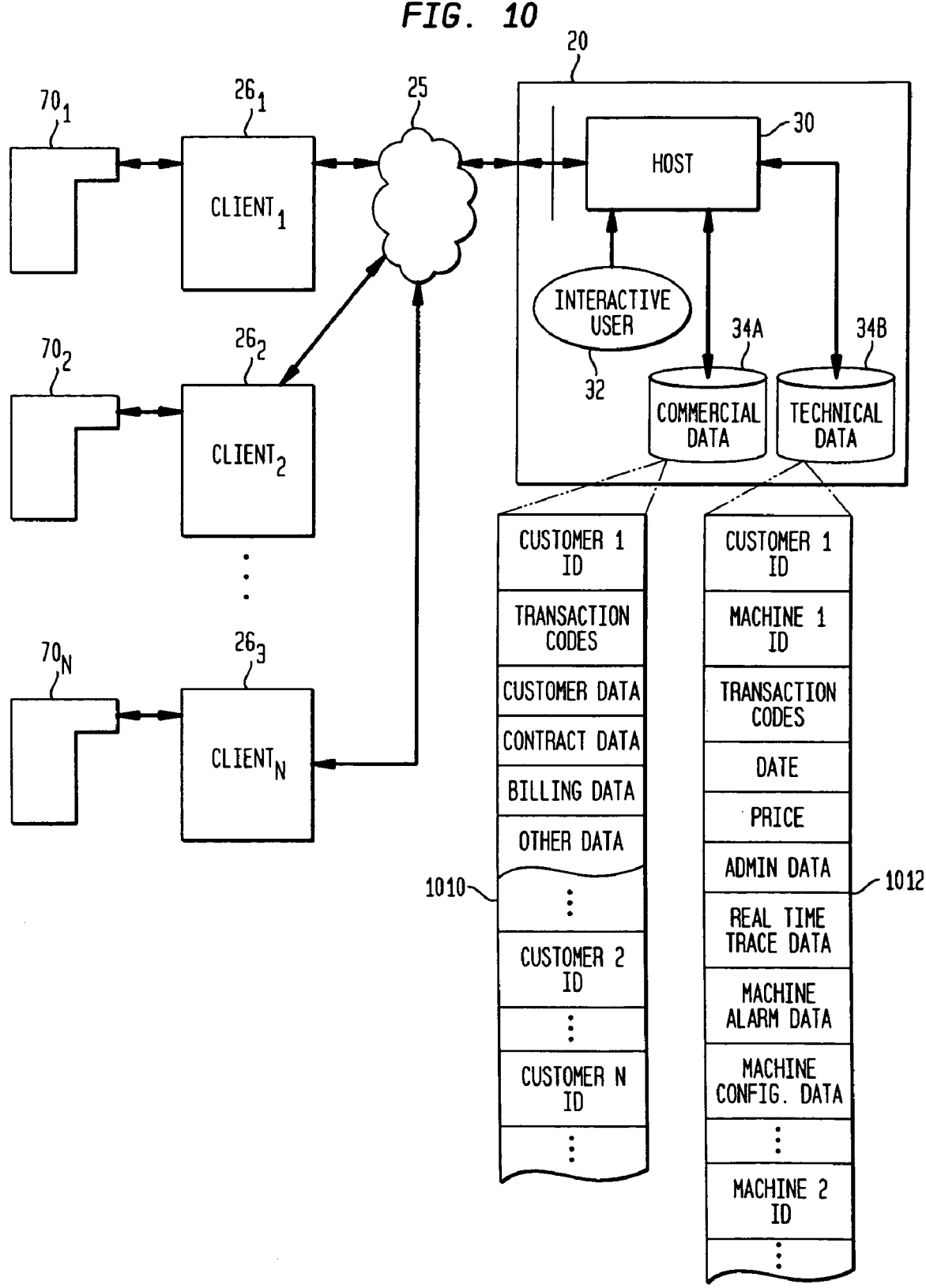
FIG. 10 shows, in schematic form, an embodiment of databases according to the present invention, and the context in which the databases are created.

An embodiment of databases according to the present invention, and the context in which the databases are created and accessed, are shown in FIG. 10. This Figure provides further detail to the architecture shown in FIG. 3, which also shows connectivity between host 30 and customers operating client system 26, or OEMs 24, or others, who may arrange for and obtain access to the databases, typically in exchange for value.

In the illustrated embodiment, service provider 20, through its host 30, provides network-delivered automation-related content to a plurality of client systems, $26_1$, $26_2$, ..., $26_N$, each controlling a respective machine tool $70_1$, $70_2$, ..., $70_N$. In the course of providing this content, data is captured by the client systems and uploaded to host system 30, which stores this, as well as other data associated with running the network-delivered automation-related content business. Host 30 writes data to at least two databases: A first database 34A comprises commercial data; a second, 34B, comprises technical data.

An example of a data structure corresponding to each of the databases is shown below each of the databases 34A and 34B. The data structure 1010 corresponding to that of database 34A comprises sets of data for each of the plurality of clients 1-N. Each set may include: a customer identifier, which may be in the form of a code, for identifying the customer responsible for the respective client; transaction codes for identifying the nature of content (e.g., services or software) that may be provided for the customer; data describing relevant aspects of the customer's business; data relating to contracts with the customer and pertinent requirements of such contracts, including prices set for particular transactions for that customer; data relating to how the customer is to be billed; and any other customer data of interest. A similar data structure, not shown, can record a customer identifier for customers that subscribe to the databases, a code identifying the nature of the access obtained, the date of the access, the price for the access (if relevant for the given pricing model), and other relevant data. In the default, access to customer data within data structure 1010 would be limited to the particular customer whose data it is. In general, however, a customer may permit access to the data structure 1010 by third parties such as particular OEMS 24.

Data structure 1012, corresponding to database 34B, comprises a plurality of data sets, one for each customer. Each customer data set within data structure 1012 may be recorded and accessed on the basis of the unique ID for that customer. Within the data for a given customer, there may be any number of sets of data corresponding to machines or client devices operated by the customer. Each such machine or client device is identified by a unique identifier or code, that is included in the data structure 1012. For that particular machine or client, various administrative data may be stored, for such reasons as ensuring that access rights are properly handled. In the default, customer data in data structure 1012 would be accessible only by the customer from whom the data was collected. A customer could, however, indicate willingness to allow access by others, e.g., machine tool manufacturers, to the data under preselected conditions; such willingness could be represented in the administrative data field of data structure 1012. The data structure may also include a code for a particular transaction with the host 30, accompanied by a date and one or more prices. Alternatively, price data might be looked up at billing time based on stored data regarding the nature of the transaction and the price arrangement for that transaction and that client stored in data structure 10. Data structure may 1012 also include, associated with a particular transaction, data collected from the client device or machine, which can include real-time control trace data captured, for example, from NCK 66 of client 26, as shown in FIG. 7, or any other data accessible according to the methods described herein. In addition, machine alarm data and machine configuration data can help provide an accurate picture of the state of client 26 during the delivery of services or software for the given transaction.

As shown in the Figures, data in both structures 1010 and 1012 are first organized by customer. Given that a customer is likely to have any number of machines for which service provider 20 may be able to provide content, a plurality of fields, each corresponding to machines operated by that customer, may be present within a given customer's data, each such machine ID (or client ID) being unique to the particular machine tool or other controlled equipment. Data structure 1012, thus, can provide a historical view of behavior over time for the particular machine.

As to each of data structures 1010 and 1012, certain information could be added or deleted, the data could be re-ordered, and other data structures could be used, consistent with this aspect of the present invention.

FIGS. 11-23 show stages associated with an example of the delivery of automation-related services, namely a machine tool circularity test, in an embodiment of the present invention. In each Figure, aspects of representative screen shots are provided, showing the view an operator of the machine tool would have when interacting with the display of HMI 50 associated with a client system 26. In the illustrated embodiment, the user runs a browser 52, running on HMI 50, to view web pages downloaded to the HMI 50 over network 25 from host 30. Where the web page provides for it, the user can select options and enter data that are sent back to host 30 by the browser.

Figure 11:
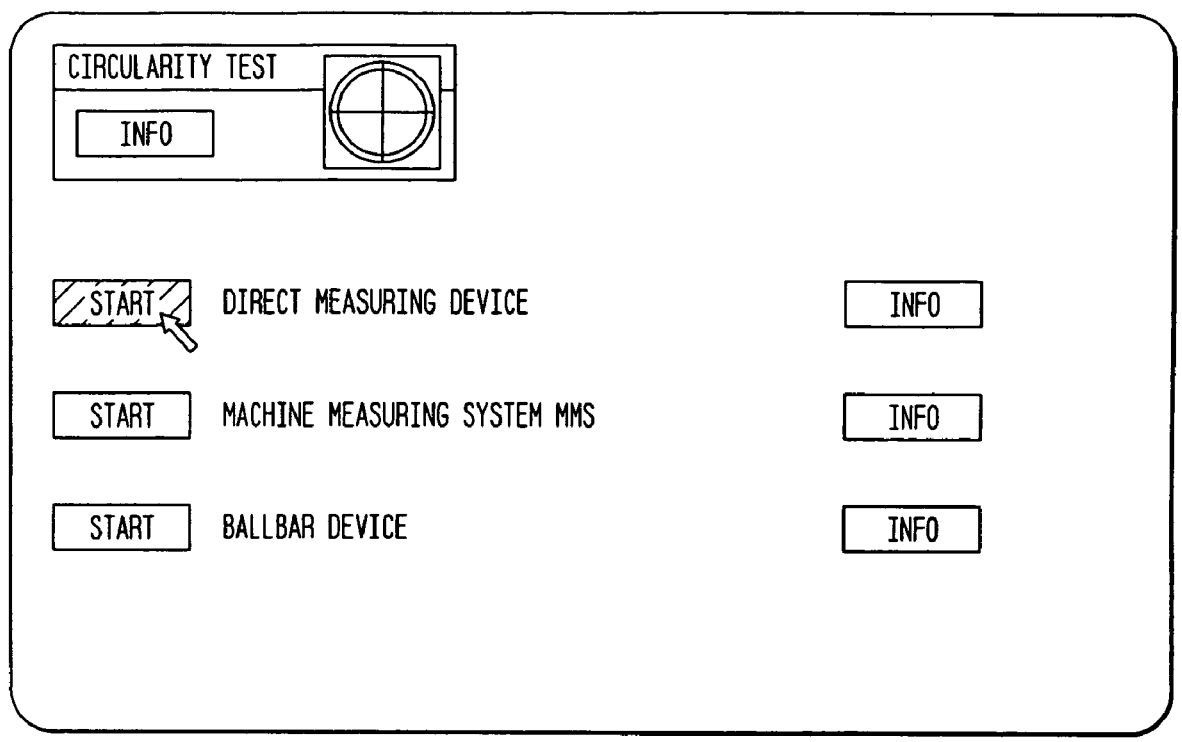
FIGS. 11-23 show stages associated with an example of the delivery of automation-related services, namely a circularity test, in an embodiment of the present invention.

In FIG. 11, the user has previously selected, from among the options that are offered for this customer and this particular machine tool, a circularity test. The user's ability to do so presupposes the previous establishment of a customer relationship on the part of the customer entity that operates the machine tool, leading to the creation of database entries analogous to those of 1010 in database 34A of FIG. 10.

The point of a circularity test is to determine the degree to which the machine tool, in any of its planes, is able to drive the end-effector through a circle. The actual path is measured and compared with a true circle. The results of the comparison permit not only inferences as to whether the machine requires maintenance, if the circle is outside of tolerances, for example, but may allow for the diagnosis of wear conditions and their causes even while the ability of the machine tool to drive a circle is within tolerances.

In FIG. 11, as indicated by the arrow, the user is selecting the start button associated with a first of a plurality of circularity measurement approaches: a direct measuring device, a machine measuring system (MMS), and a ballbar device. For each of these options, the user can retrieve information by pushing the respective information button. The user can also request information about the circularity test itself by pressing the information button in the upper left hand corner, immediately below the legend "CIRCULARITY TEST."

Figure 12:
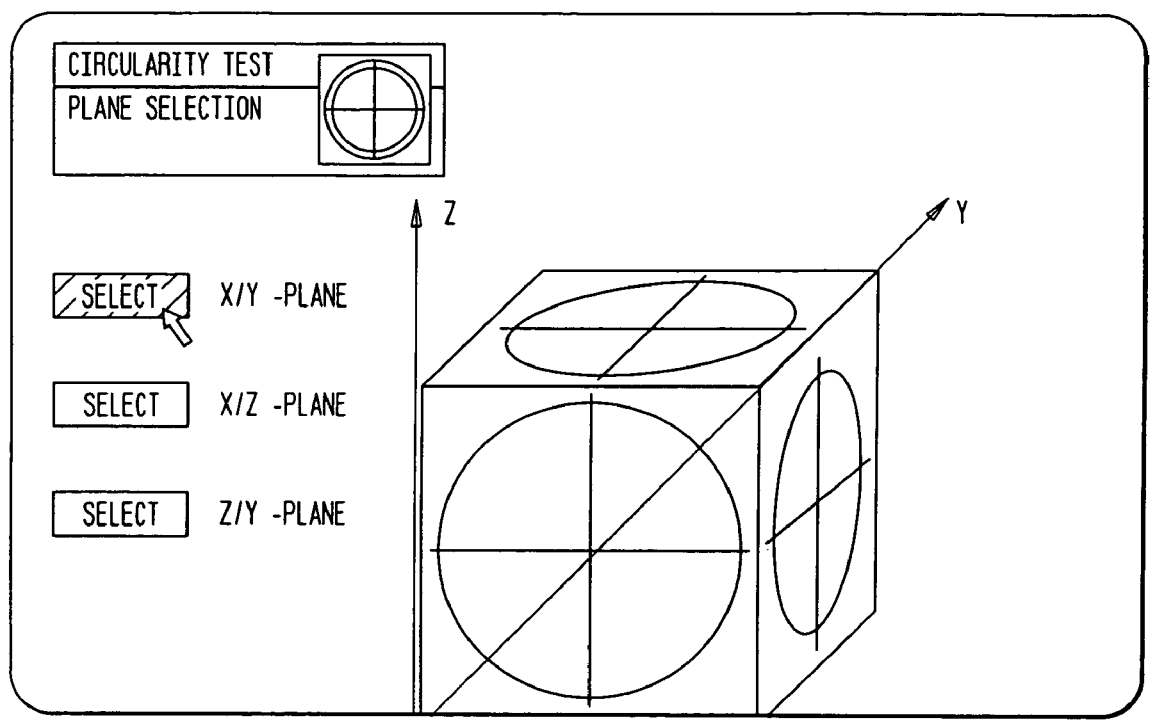
Figure 13:
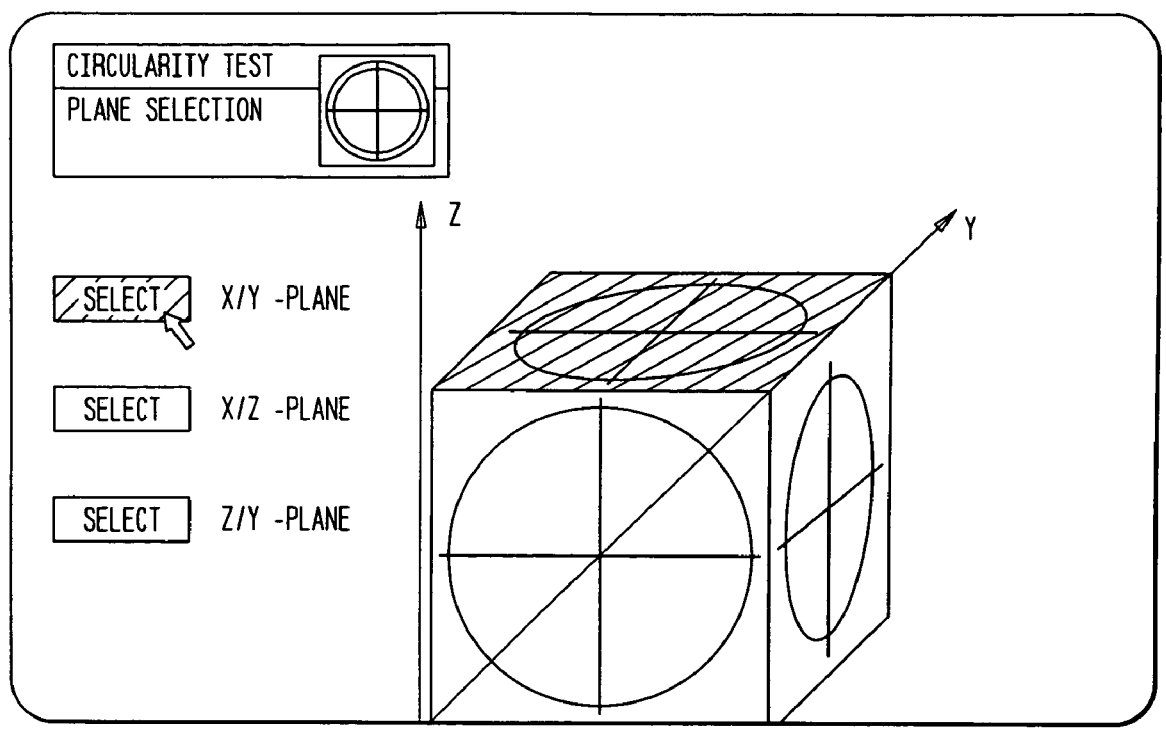

FIG. 12 shows a subsequent web page, in which the user is prompted to select a plane in which the circle is to be driven. A cube representing three planes is shown, as are options for selecting three primary planes (identified by the pairs of axes that define them). In this Figure, the user has selected the X/Y plane. This selection is uploaded to the host 30, which sends updated webpage data, shown in FIG. 13. This webpage data includes shading of the X/Y plane selection button, as well as the selected plane on the cube, providing the user with visual queues to assist in confirming that the desired selection has been correctly made.

Figure 14:
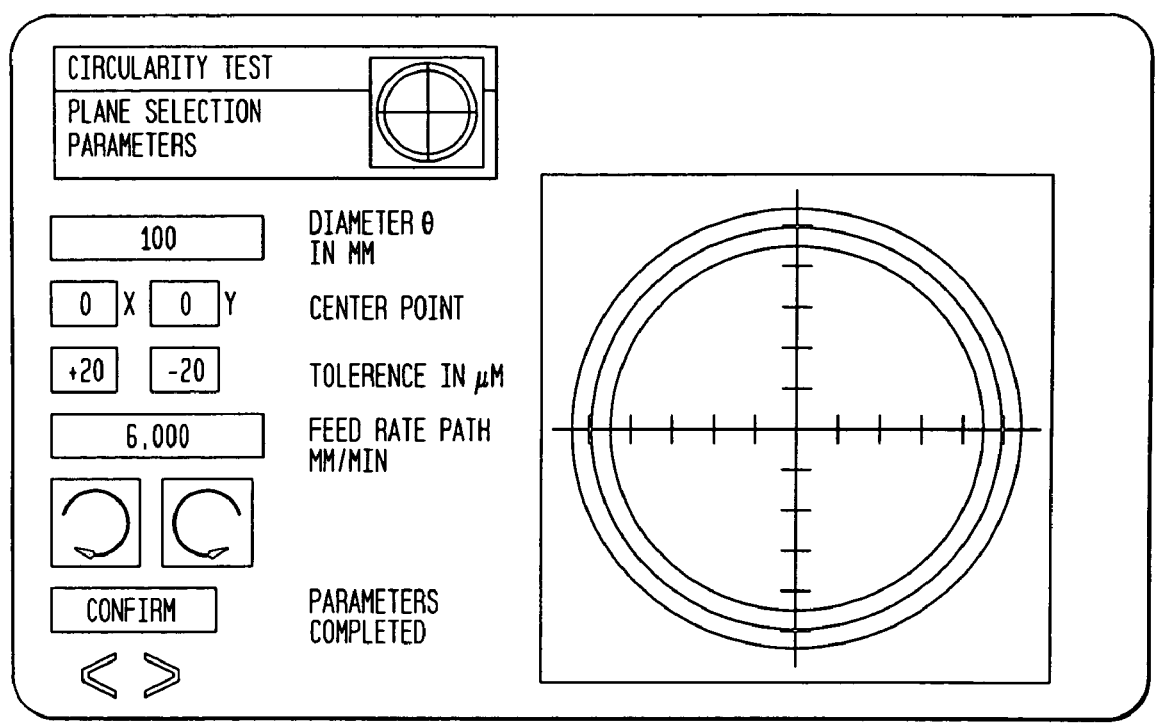

Once host 30 receives complete information as to plane selection, it downloads a webpage, shown in FIG. 14, including a form that permits the user to enter plane selection parameters. The parameters include the diameter of the circle, the center point of the circle (in X/Y Cartesian coordinates), tolerances +/− in microns, the feed rate path in millimeters per minute, the direction of travel (clockwise or counterclockwise), and a confirmation button indicating that selection of parameters is complete. Also downloaded in the webpage shown in FIG. 14 is a graph in the X/Y plane showing the centerpoint, and three concentric circles centered at that point, including the desired circle and outer and inner circles defining the as yet unspecified tolerance band about the desired circle.

Figure 15:
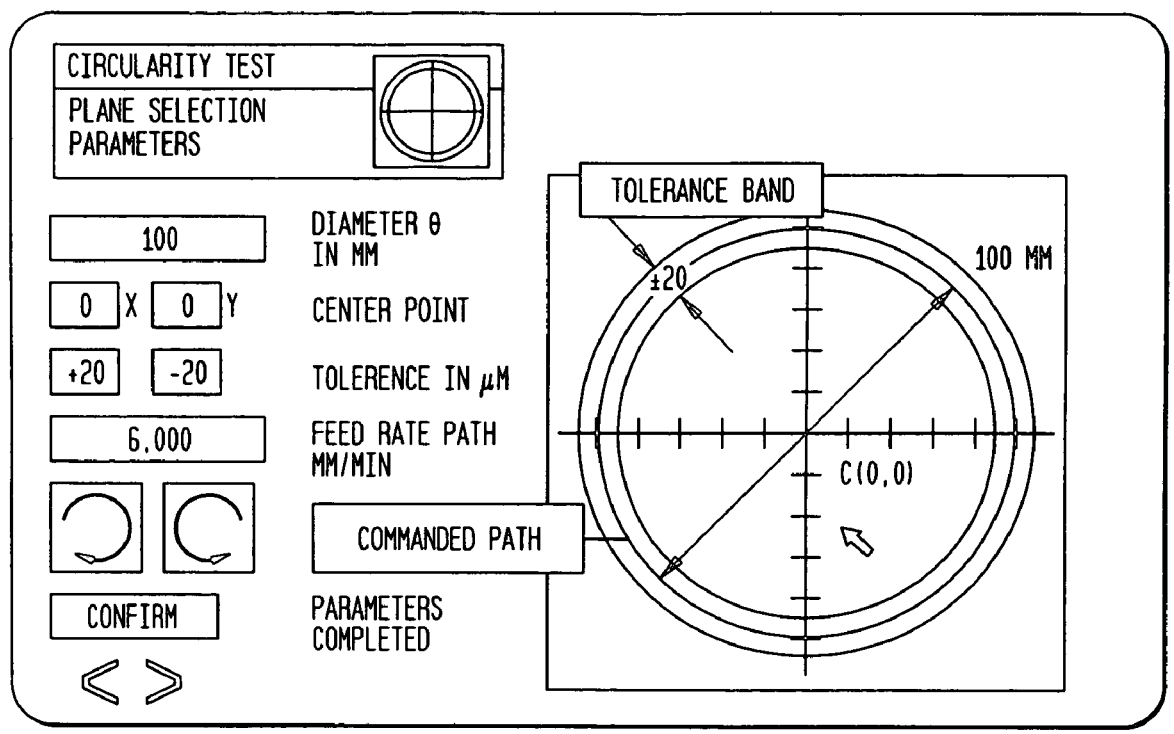

In FIG. 15, the diameter, center point and tolerance band settings have been received from the browser 52 by the host 30, which then downloads a webpage update indicating on the graph the selected diameter of 100 mm, and outer and inner circles defining the tolerance band of +/−20 mm about the desired circle centered at (X=0, Y=0). In addition, the user is prompted to specify a commanded path, either clockwise or counterclockwise.

Figure 16:
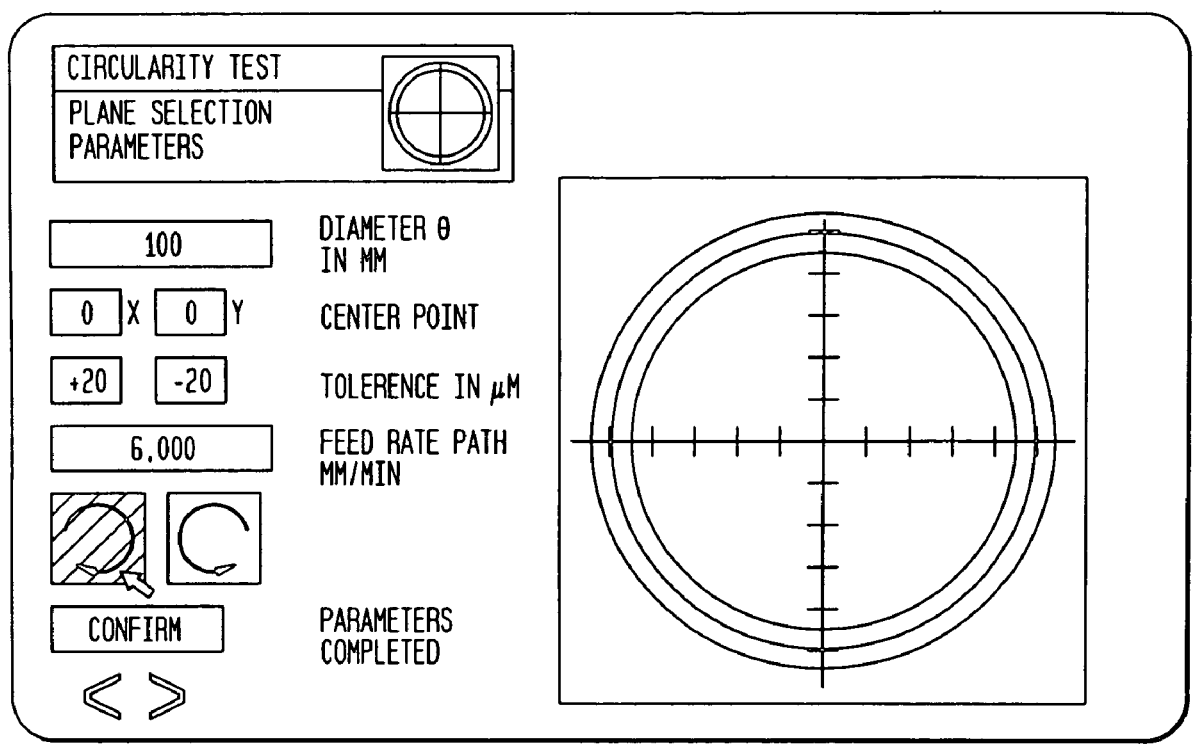
Figure 17:
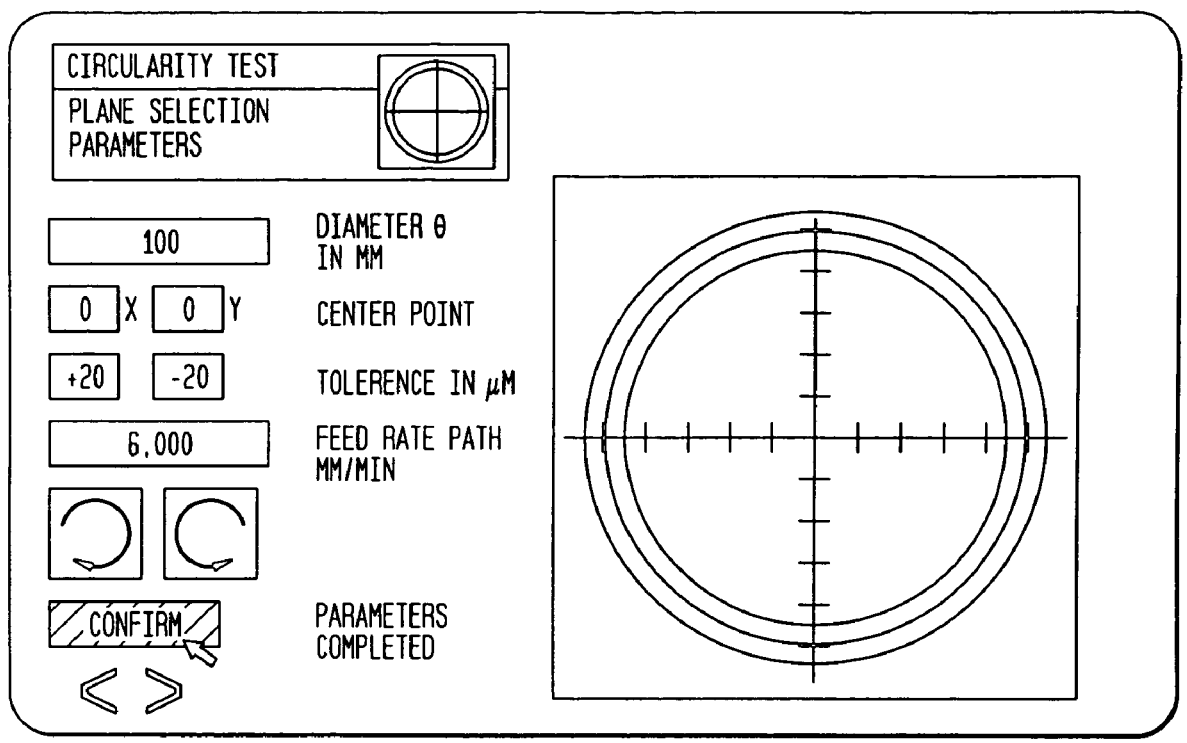

In FIG. 16, the user selects the clockwise commanded path, uploaded by the browser 52 to the host 30. Host 30 downloads to browser 52 a webpage update, shown in FIG. 17, in which the various user selections are highlighted, to provide user feedback that its selections are ready to be registered. The user does so, by pressing "confirm", notifying host 30 that the parameters for the circularity test have been completed.

Figure 18:
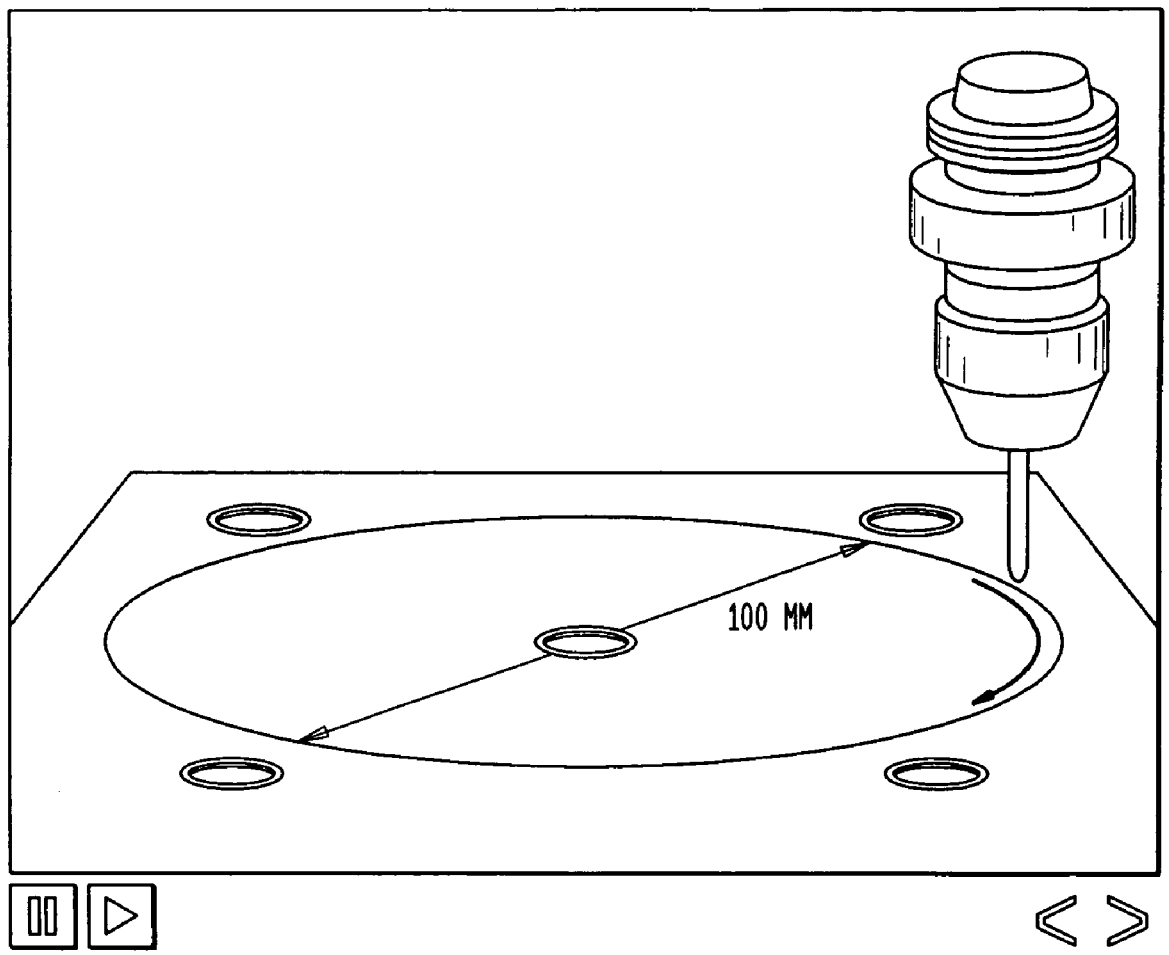
Figure 19:
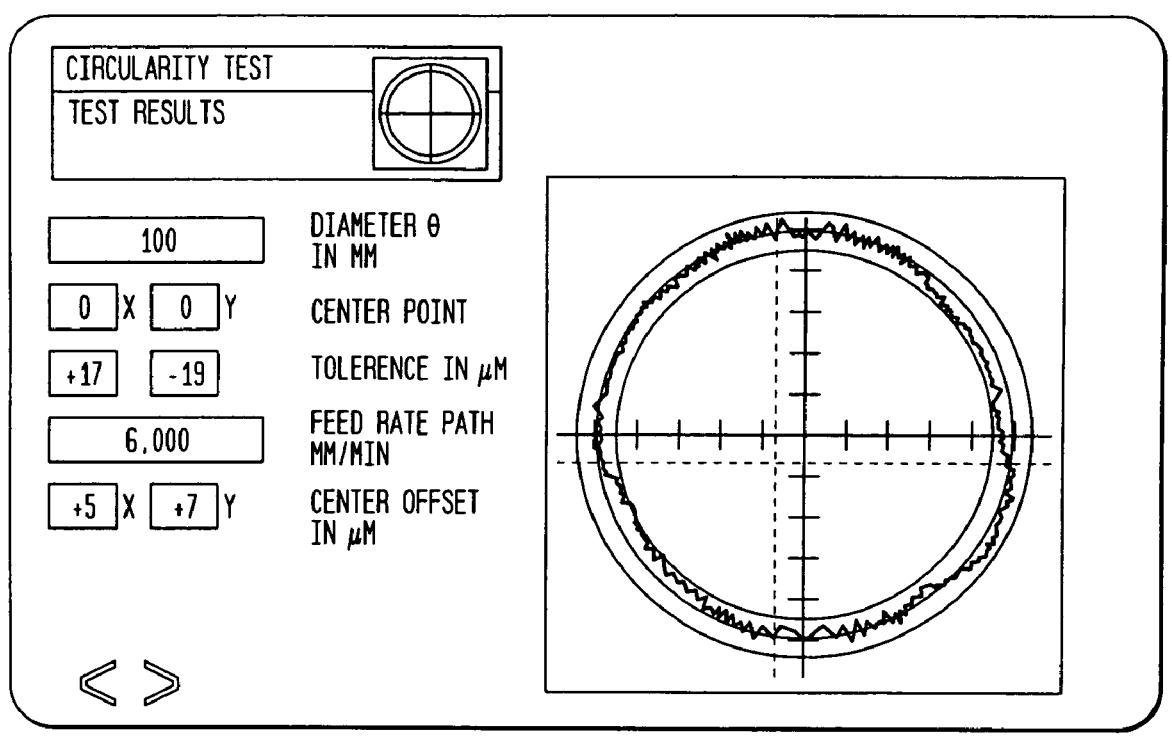
Figure 20:
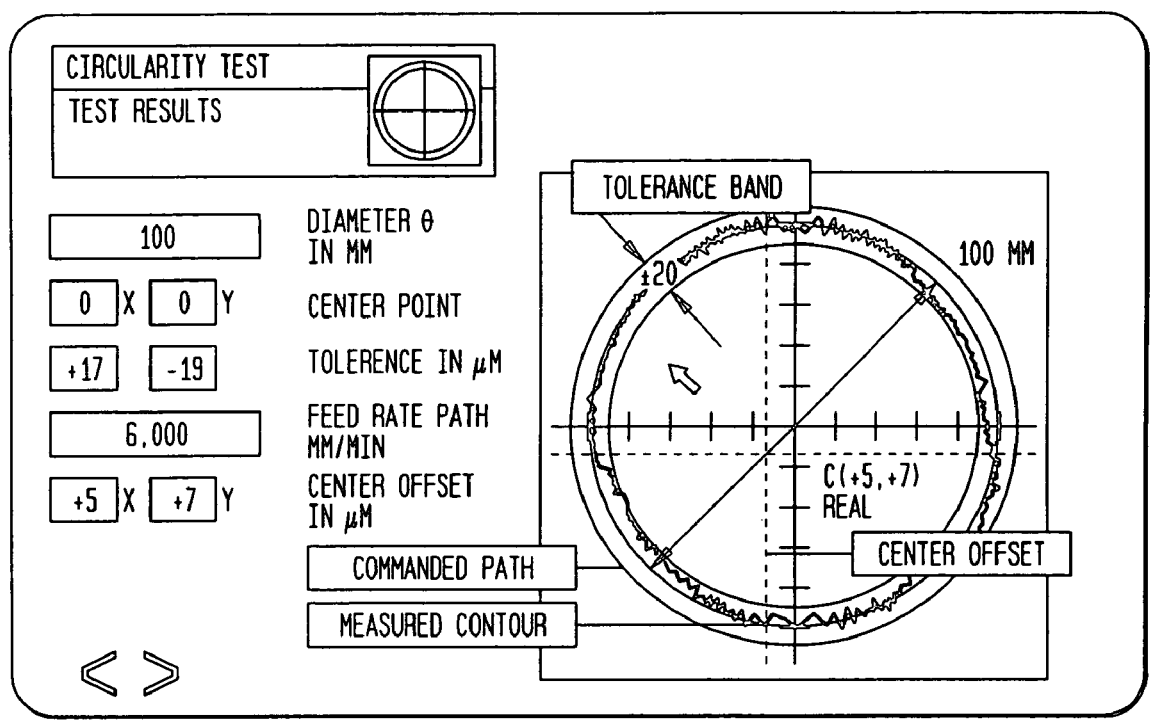

FIG. 18 shows a view of the machine tool relative to the path it has been specified by the user to drive. According to the approach described above in connection with FIGS. 4-8(A-C), host 30 downloads software to the browser 52, that is processed by the machine handler interface 54, machine handler 56, operator panel logical interface 64, and run by NCK 66 to drive the machine tool through the circle having the selected parameters and to capture data measured by a direct measuring device, as the user had also selected. The captured data is uploaded to host 30, according to the approach described above, where it is processed (e.g., by numerical analysis module 512 in FIG. 5), and where updated webpage information is generated and downloaded to browser 52. The user can then see, as shown in FIGS. 19 and 20, the path superimposed over the graph, including the actual tolerances and center offset, and can also read the tolerances in numerical form—here (+17, −19), rather than (+20, −20) as specified— and can read the measured offset of (+5, +7).

Figure 21:
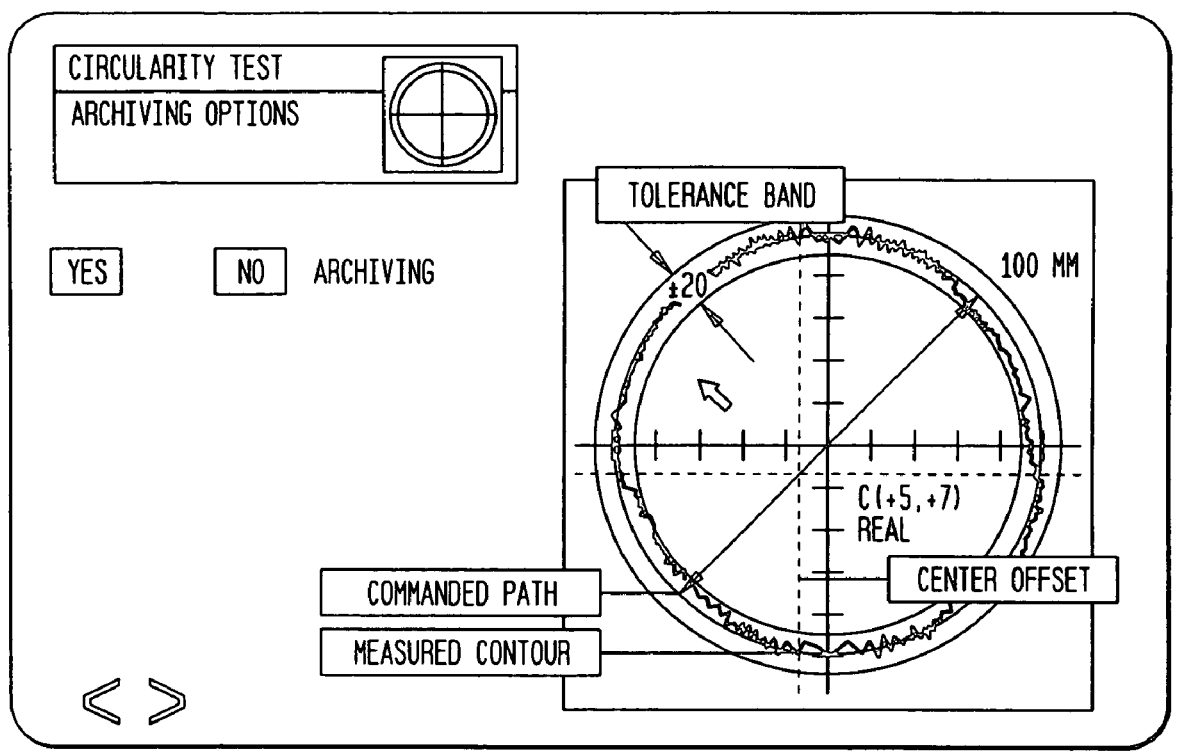

In FIG. 21, the user is then prompted by download from host 30 whether or not to archive the results of the circularity test. Here, the user has selected "YES", leading the host 30 to archive the data in a database, such as 34B and in a form analogous to data structure 1012.

Figure 22:
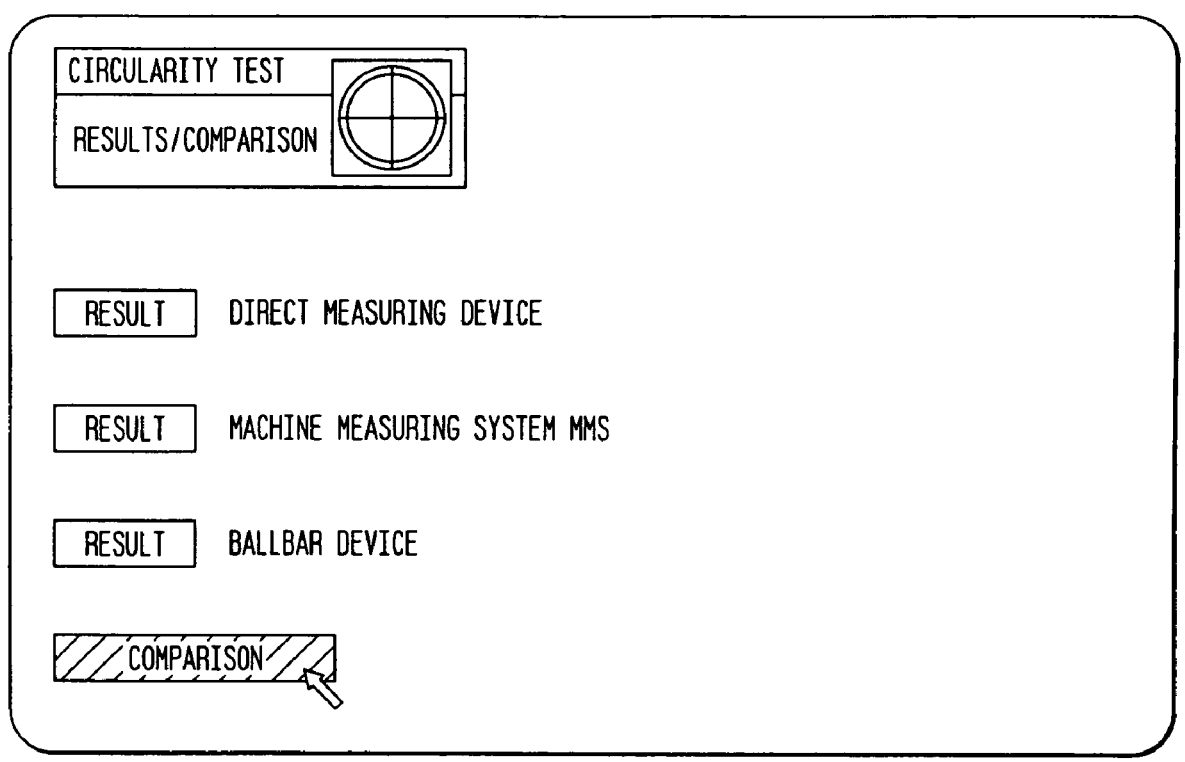
Figure 23:
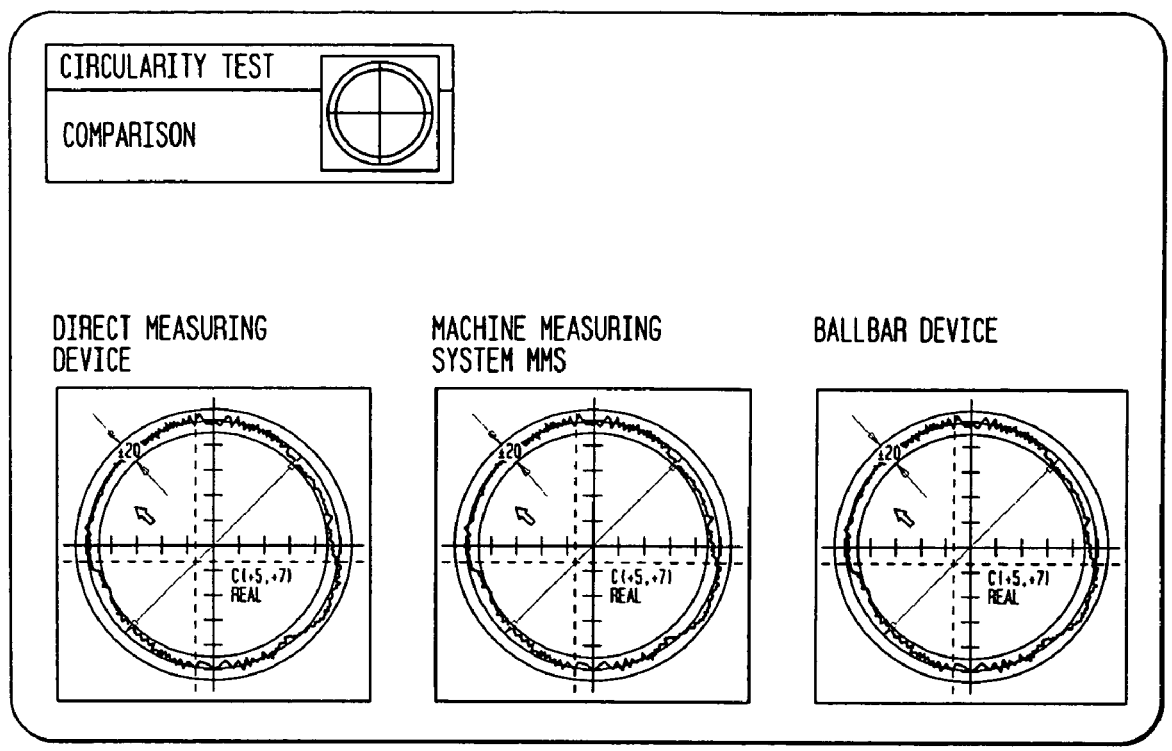

In FIG. 22, the user is permitted to take advantage of not only the most recently archived circularity test data, but also earlier-archived data. A results/comparison webpage downloaded by host 30 permits the user to inspect the results for each of three tests each done using a different one of the three methods presented in FIG. 11, the inspection being of the particular selected results individually. The user is also prompted to conduct a comparison of the three results. In this case, the user selects the comparison. The selection is uploaded to the host 30, which retrieves the data from the archive (e.g., from data structure 1012 in database 34B). In FIG. 23, three plots are shown, each in the same format as the results shown in FIGS. 19 and 20. They are smaller, to permit side-by-side comparison. In the illustrated example, the results are virtually or actually identical for each of the three approaches to circularity testing, although this would not generally be the case.

Although not shown in these Figures, host 30 may be configured to keep track of the date and time of the foregoing transaction and, based on customer data stored in data structure 1010 of database 34A, compute a price to be paid by the customer.

To summarize, FIGS. 11-23 show how a customer 23, that is an owner and/or operator of a client 26, belonging to a customer, can invoke electronic, network-delivered content, from a remote host. The content includes software that drives the machine tool through a particular motion, parameterized by the user, configures the client 26 to capture real-time data associated with that machine tool motion, uploads the captured data to the host for analysis and formatting for inspection by the user, and, at the user's instance, stores it in an archive. The user is then permitted to inspect not only this result, but other, previous results obtained through differing approaches, as well as conduct a comparison of the results obtained by the differing approaches.

The foregoing example is for purposes of illustration only and is non-limiting. Indeed, a wide variety of content, including services and software, are made possible through the various innovations attributable to the present invention, including the following: Machine-related services, such as machine utilization evaluation, including run-time data collection, software BDE; function build-up and use, including compilation of evaluations to develop a picture of machine run-time, down-time and capacity; axis analyses; Fourier transform and Bode plot generation, identification of eigenfrequencies, periodic analysis, and trend analysis; axis parameter optimization, including engagement speed, acceleration, jerk, filter, KV-factor, and friction and looseness compensation. Other areas of service that can be provided in accordance with the present invention include: machine data checks, for correctness and consistency of functions and data storage; wear analysis, including path-following protocol and behavior evaluation, trend analysis, play, friction, lubrication and transmission problems; process monitoring, including drive parameters, protocol keeping, current capacity, moments, jerk, revolution measurement, and temperature. The system and method according to the present invention make possible: remote machine inspection and acceptance techniques that were not previously possible, including circle formation test for path-following evaluation, repetition precision, stiffness measurement and the like; machine calibration, including single-axis calibration, rotational axis calibration and workpiece/device measurement. Other areas of content provision enabled by the various aspects of the present invention include: dynamic machine modeling and analysis; workpiece-related services, including those relating to workpiece geometry (such as measurement and documentation of tracking precision and trace functionality relative to actual target) and workpiece surfaces (including measurement and documentation of dynamic tracking behavior, speed, acceleration); workpiece surface quality simulation, surface NC-program input, surface interpolator output, surface position target, and surface (actual) from current drive data. Yet another area involves: process analyses, including measurement and documentation and analysis of process parameters, calculation and documentation of cutting speed and cutting power, laser output, and the like. Additional significant areas for providing services made possible by the advances of the present invention include: software services, such as sale and distribution, delivery of new versions of product software, delivery of service packs, delivery of communication software; data management services relating to machine data, NC program data, system software, PLC programs, results data, process data, workpiece data, archiving, back-up and configuration management; and automation system maintenance, delivery of diagnosis software, provision of tools for the identification of defective components in event of failure, storing of change history of a facility, access to a bug-tracking system, connection to internet ordering systems, central service account management, consulting for special problems and incident handling.

In addition to the embodiments of the aspects of the present invention described above, those of skill in the art will be able to arrive at a variety of other arrangements and steps which, if not explicitly described in this document, nevertheless embody the principles of the invention and fall within the scope of the appended claims. For example, the ordering of method steps is not necessarily fixed, but may be capable of being modified without departing from the scope and spirit of the present invention.

What is claimed is:

1. A system for providing programming code relating to machine tool control, comprising:
   a host system generating and delivering programming code relating to a computer controlled machine tool;
   and a client system, in communication with the host system, collecting real-time data from the computer controlled machine tool, transmitting the data to the host system, and receiving from the host system programming code generated as a function of the collected data.

2. The system according to claim 1, wherein a computer system run by an original equipment manufacturer (OEM) is in communication with the host system and the host system is adapted to support access to host system data by the OEM system.

3. The system according to claim 2, wherein the OEM computer system accesses the host system via a network in exchange for a conveyance of value to an operator of the host system.

4. The system according to claim 1, wherein data are transmitted between the host system and the client system over an internet.

5. The system according to claim 1, wherein the programming code is run by the client system to operate the machine tool in a preselected manner and to collect a preselected set of data associated with running the computer in the preselected manner.

6. The system according to claim 1, wherein the client system is programmed to transmit a unique identifying code to the host system, and the host system is programmed to associate the identifying code with data received from the client system.

7. The system according to claim 6, wherein to client system's collection of data are directed by instructions received over the internet from the host system.

8. The system according to claim 7, wherein the client system receives web pages from the host system and an operator of the client system selects options presented in one or more of the web pages.

9. The system according to claim 1, wherein the client system is programmed to transmit a unique identifying code to the host system, and the host system is programmed to associate the identifying code with data received from the client system.

10. The system according to claim 9, wherein the client system's collection of data are directed by instructions received over the internet from the host system.

11. The system according to claim 10, wherein the client system receives web pages from the host system and an operator of the client system selects options presented in one or more of the web pages.

12. The system according to claim 1, wherein a computer system run by an original equipment manufacturer (OEM) is in communication with the host system and the host system is adapted to support access to host system data by the OEM system.

13. The system according to claim 12, wherein the OEM computer system accesses the host system via a network in exchange for a conveyance of value to an operator of the host system.

* * * * *

UNITED STATES PATENT AND TRADEMARK OFFICE
CERTIFICATE OF CORRECTION

PATENT NO. : 7,292,900 B2  Page 1 of 1
APPLICATION NO. : 09/950726
DATED : November 6, 2007
INVENTOR(S) : Volker Kreidler et al.

It is certified that error appears in the above-identified patent and that said Letters Patent is hereby corrected as shown below:

Title Page, Item [54], "Power Distribution Expert System" should read --System Architecture and Method for Network-Delivered Automation-Related Content--

Signed and Sealed this

Second Day of September, 2008

JON W. DUDAS
*Director of the United States Patent and Trademark Office*

UNITED STATES PATENT AND TRADEMARK OFFICE
CERTIFICATE OF CORRECTION

PATENT NO.         : 7,292,900 B2                                        Page 1 of 1
APPLICATION NO.    : 09/950726
DATED              : November 6, 2007
INVENTOR(S)        : Volker Kreidler et al.

It is certified that error appears in the above-identified patent and that said Letters Patent is hereby corrected as shown below:

Title Page, Item [54], and Column 1, line 1, "Power Distribution Expert System" should read --System Architecture and Method for Network-Delivered Automation-Related Content--

This certificate supersedes the Certificate of Correction issued September 2, 2008.

Signed and Sealed this

Thirtieth Day of September, 2008

JON W. DUDAS
*Director of the United States Patent and Trademark Office*